United States Patent
Hall et al.

(10) Patent No.: US 10,439,474 B2
(45) Date of Patent: Oct. 8, 2019

(54) TURBINES AND METHODS OF GENERATING ELECTRICITY

(71) Applicant: Schlumberger Technology Corporation, Sugar Land, TX (US)

(72) Inventors: David R. Hall, Provo, UT (US); Jonathan D. Marshall, Springville, UT (US); Jordan Dane Englund, Provo, UT (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/352,620

(22) Filed: Nov. 16, 2016

(65) Prior Publication Data

US 2018/0135434 A1    May 17, 2018

(51) Int. Cl.
| | | |
|---|---|---|
| *H02K 7/18* | (2006.01) | |
| *F03B 13/02* | (2006.01) | |
| *E21B 4/02* | (2006.01) | |

(52) U.S. Cl.
CPC ............. *H02K 7/1823* (2013.01); *E21B 4/02* (2013.01); *F03B 13/02* (2013.01)

(58) Field of Classification Search
USPC .................. 290/1 R, 52; 175/57; 367/83
See application file for complete search history.

(56) References Cited

U.S. PATENT DOCUMENTS

| | | | |
|---|---|---|---|
| 2,266,355 A | | 12/1941 | Chun et al. |
| 4,132,269 A | * | 1/1979 | Chasteen ................ E21B 43/20 166/268 |
| 4,155,022 A | * | 5/1979 | Crockett ................. F03B 13/10 290/52 |
| 4,491,738 A | * | 1/1985 | Kamp ................ E21B 41/0085 175/40 |
| 4,532,614 A | * | 7/1985 | Peppers ............... G01V 11/002 324/369 |
| 4,628,995 A | | 12/1986 | Young et al. |
| 4,671,735 A | * | 6/1987 | Rossmann ................ F01D 5/20 415/173.1 |
| 5,248,896 A | * | 9/1993 | Forrest ..................... F03B 13/02 175/107 |
| 5,265,682 A | | 11/1993 | Russell et al. |
| 5,285,204 A | * | 2/1994 | Sas-Jaworsky ....... E21B 17/203 175/40 |
| 5,517,464 A | * | 5/1996 | Lerner ................ E21B 41/0085 175/45 |
| 5,803,185 A | | 9/1998 | Barr et al. |
| 5,839,508 A | * | 11/1998 | Tubel .................. E21B 41/0085 166/65.1 |
| 6,089,332 A | | 7/2000 | Barr et al. |

(Continued)

FOREIGN PATENT DOCUMENTS

WO    2018093355 A1    5/2018

OTHER PUBLICATIONS

Office Action Issued in U.S. Appl. No. 15/152,189 dated Jan. 18, 2018. 7 pages.

(Continued)

*Primary Examiner* — Pedro J Cuevas

(57) ABSTRACT

A turbine includes a rotor. The rotor is connected to at least one blade. The blade is at least partially ultrahard material.

20 Claims, 27 Drawing Sheets

(56) References Cited

U.S. PATENT DOCUMENTS

| | | | | |
|---|---|---|---|---|
| 6,386,302 | B1* | 5/2002 | Beaton | E21B 10/26 175/385 |
| 6,554,074 | B2* | 4/2003 | Longbottom | E21B 41/0085 166/372 |
| 6,607,030 | B2* | 8/2003 | Bauer | E21B 41/0085 166/65.1 |
| 6,672,409 | B1* | 1/2004 | Dock | E21B 7/046 166/66.5 |
| 6,717,283 | B2* | 4/2004 | Skinner | E21B 41/0085 290/43 |
| 6,848,503 | B2* | 2/2005 | Schultz | E21B 41/0085 166/66.5 |
| 6,851,481 | B2 | 2/2005 | Vinegar et al. | |
| 7,002,261 | B2* | 2/2006 | Cousins | E21B 41/0085 290/43 |
| 7,133,325 | B2* | 11/2006 | Kotsonis | E21B 41/0085 175/48 |
| 7,137,463 | B2* | 11/2006 | Beaton | E21B 10/26 175/335 |
| 7,190,084 | B2* | 3/2007 | Hall | E21B 41/0085 290/1 R |
| 7,293,617 | B2* | 11/2007 | Beaton | E21B 10/26 175/335 |
| 7,348,893 | B2 | 3/2008 | Huang et al. | |
| 7,434,634 | B1* | 10/2008 | Hall | E21B 41/0085 166/65.1 |
| 7,451,835 | B1* | 11/2008 | Hall | E21B 41/0085 166/65.1 |
| 7,484,576 | B2* | 2/2009 | Hall | E21B 4/06 175/104 |
| 7,537,051 | B1* | 5/2009 | Hall | E21B 41/0085 166/65.1 |
| 7,650,952 | B2* | 1/2010 | Evans | E21B 17/1078 175/325.4 |
| 7,814,993 | B2* | 10/2010 | White | E21B 41/0085 175/107 |
| 8,033,328 | B2* | 10/2011 | Hall | E21B 41/0085 166/65.1 |
| 8,092,147 | B2 | 1/2012 | Draeger et al. | |
| 8,297,375 | B2 | 10/2012 | Hall et al. | |
| 8,297,378 | B2* | 10/2012 | Hall | E21B 4/14 175/107 |
| 8,366,400 | B2* | 2/2013 | Ochiai | F01D 11/122 415/173.4 |
| 8,596,368 | B2 | 12/2013 | Frosell | |
| 8,656,589 | B2* | 2/2014 | Kurt-Elli | F01D 5/16 29/402.18 |
| 8,792,304 | B2 | 7/2014 | Sugiura | |
| 8,957,538 | B2 | 2/2015 | Inman et al. | |
| 9,013,957 | B2 | 4/2015 | Vecseri et al. | |
| 9,035,788 | B2 | 5/2015 | Downton et al. | |
| 9,038,735 | B2 | 5/2015 | Segura et al. | |
| 9,046,080 | B2* | 6/2015 | Sliwa | F03D 11/00 |
| 9,309,748 | B2* | 4/2016 | Gadot | E21B 41/0085 |
| 9,312,557 | B2 | 4/2016 | Zhang et al. | |
| 9,356,497 | B2 | 5/2016 | Chambers | |
| 9,534,577 | B2* | 1/2017 | Inman | E21B 21/10 |
| 9,546,539 | B2* | 1/2017 | Hudson | E21B 41/0085 |
| 9,598,937 | B2* | 3/2017 | Chen | F03B 13/02 |
| 10,113,399 | B2 | 10/2018 | Hall et al. | |
| 2002/0125047 | A1* | 9/2002 | Beaton | E21B 10/26 175/406 |
| 2002/0162654 | A1* | 11/2002 | Bauer | E21B 41/0085 166/65.1 |
| 2003/0116969 | A1* | 6/2003 | Skinner | E21B 41/0085 290/1 R |
| 2004/0206552 | A1* | 10/2004 | Beaton | E21B 10/26 175/385 |
| 2005/0012340 | A1* | 1/2005 | Cousins | E21B 41/0085 290/52 |
| 2005/0139393 | A1* | 6/2005 | Maurer | E21B 41/0085 175/57 |
| 2006/0016606 | A1* | 1/2006 | Tubel | E21B 41/0085 166/386 |
| 2006/0100968 | A1 | 5/2006 | Hall et al. | |
| 2006/0175838 | A1* | 8/2006 | Tips | E21B 41/0085 290/1 R |
| 2007/0029115 | A1* | 2/2007 | Beaton | E21B 10/26 175/406 |
| 2007/0175032 | A1* | 8/2007 | Kurt-Elli | F01D 5/16 29/889.21 |
| 2007/0194948 | A1* | 8/2007 | Hall | E21B 17/003 340/854.8 |
| 2007/0272410 | A1 | 11/2007 | Hromas et al. | |
| 2008/0047753 | A1 | 2/2008 | Hall et al. | |
| 2008/0047754 | A1* | 2/2008 | Evans | E21B 17/1078 175/61 |
| 2008/0226460 | A1* | 9/2008 | Ochiai | F01D 5/20 416/241 R |
| 2008/0284174 | A1* | 11/2008 | Nagler | F03B 13/00 290/54 |
| 2008/0298962 | A1* | 12/2008 | Sliwa | F03D 11/00 416/31 |
| 2010/0065334 | A1* | 3/2010 | Hall | E21B 4/14 175/107 |
| 2011/0273147 | A1* | 11/2011 | Hall | H02P 9/48 322/28 |
| 2011/0280105 | A1* | 11/2011 | Hall | E21B 47/182 367/83 |
| 2012/0139250 | A1 | 6/2012 | Inman et al. | |
| 2014/0014413 | A1 | 1/2014 | Niina et al. | |
| 2014/0174733 | A1* | 6/2014 | Gadot | E21B 41/0085 166/264 |
| 2015/0107244 | A1* | 4/2015 | Lakic | F24J 3/082 60/641.2 |
| 2015/0194860 | A1 | 7/2015 | Caliz et al. | |
| 2016/0017693 | A1* | 1/2016 | Winslow | E21B 41/0085 175/95 |
| 2016/0265315 | A1 | 9/2016 | Frosell et al. | |
| 2016/0341012 | A1 | 11/2016 | Riley et al. | |
| 2016/0341013 | A1 | 11/2016 | Hall et al. | |
| 2017/0241242 | A1 | 8/2017 | Marshall et al. | |
| 2019/0048691 | A1 | 2/2019 | Hall et al. | |

OTHER PUBLICATIONS

International Search Report and Written Opinion issued in International Patent Application PCT/US2016/062116, dated Sep. 26, 2017. 23 pages.

Office Action Issued in U.S. Appl. No. 15/590,882 dated Dec. 10, 2018, 8 pages.

Office Action Issued in U.S. Appl. No. 15/590,882 dated Apr. 24, 2019, 6 pages.

* cited by examiner

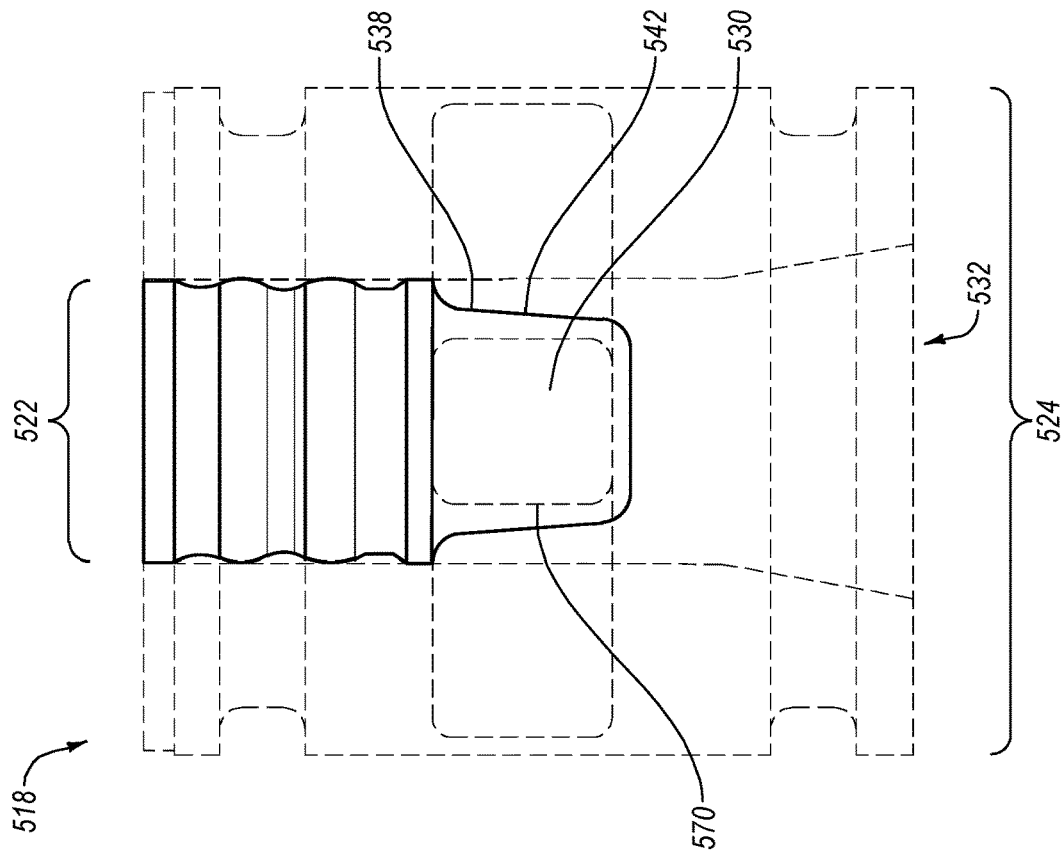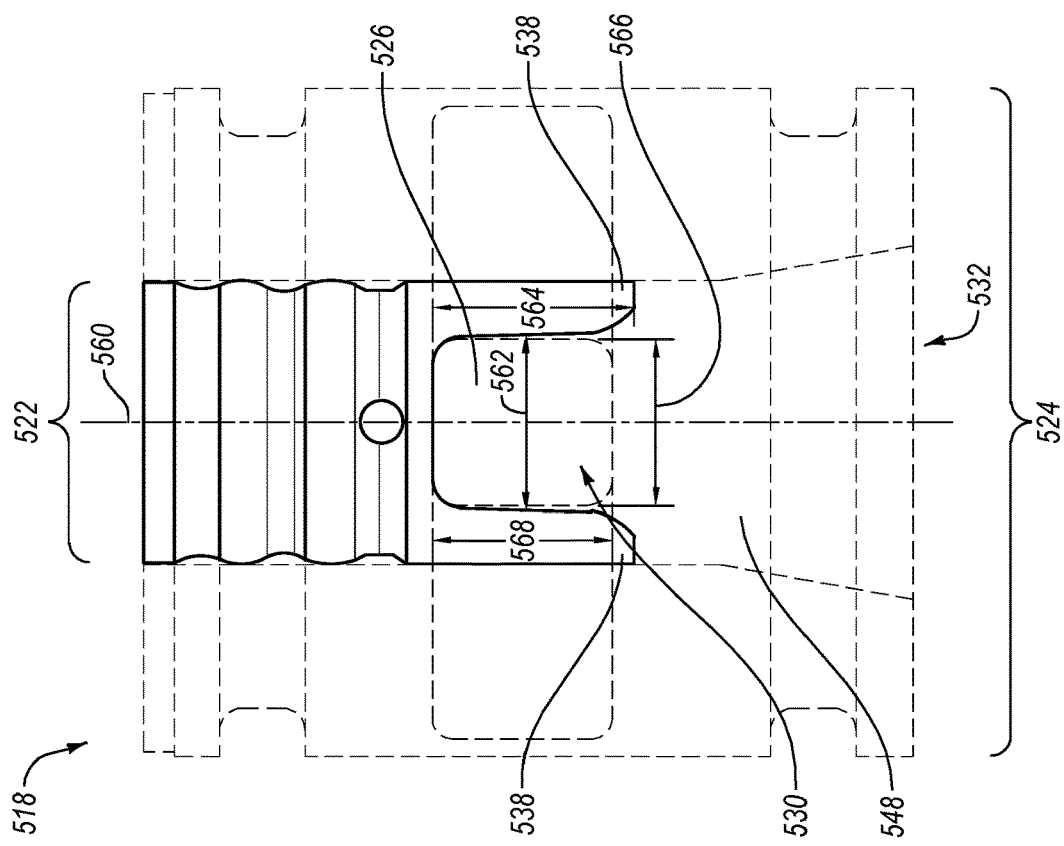

TURBINES AND METHODS OF GENERATING ELECTRICITY

CROSS-REFERENCE TO RELATED APPLICATIONS

N/A

BACKGROUND OF THE DISCLOSURE

Wellbores may be drilled into a surface location or seabed for a variety of exploratory or extraction purposes. For example, a wellbore may be drilled to access fluids, such as liquid and gaseous hydrocarbons, stored in subterranean formations and to extract the fluids from the formations. Wellbores used to produce or extract fluids may be lined with casing around the walls of the wellbore. A variety of drilling methods may be utilized depending partly on the characteristics of the formation through which the wellbore is drilled.

The wellbores may be drilled by a drilling system that drills through earthen material downward from the surface. Some wellbores are drilled vertically downward, and some wellbores have one or more curves in the wellbore to follow desirable geological formations, avoid problematic geological formations, or a combination of the two.

Conventional drilling systems are limited in how rapidly the wellbore can change direction. One of the largest limitations on the steerability of a drilling system is the length of the rigid downhole tools at the downhole end of the drilling system (i.e., near the drill bit). Some of the rigid components include turbomotors, mud motors, rotary steerable systems, and other components that provide energy to move or steer the drill bit.

SUMMARY

In some embodiments, a turbine in includes a rotor. The rotor is connected to at least one blade. At least a portion of the at least one blade includes an ultrahard material.

In some embodiments, a turbine includes a housing, a wheel, a rotor, and a generator. The housing includes an inlet and an outlet. The wheel includes at least one blade. At least a portion of the at least one blade includes polycrystalline diamond. The rotor is rotatable by the wheel and at least part of the rotor is disposed within the generator. The generator is configured to generate power proportionally to the rotational speed of the rotor.

In some embodiments, a method of generating electrical power includes directing a fluid through an inlet, to a wheel, and out an outlet, wherein there is a first pressure differential across the inlet, a second pressure differential across the outlet, and a total pressure differential across both the inlet and the outlet. The method further includes rotating the wheel to rotate a rotor coupled to the wheel and generating power in a generator.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements may be designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 3-1 is a perspective view of an embodiment of an interior body of a valve and FIG. 3-2 is a perspective view of an embodiment of an exterior body of a valve;

FIG. 4-1 is a side view of an embodiment of a recess in an exterior body, FIG. 4-2 is a side view of another embodiment of a recess in an exterior body, and FIG. 4-3 is a side view of yet another embodiment of a recess in an exterior body;

FIG. 5-1 is a side partial cutaway view of an embodiment of a valve in an open configuration, and FIG. 5-2 is a side partial cutaway view of the embodiment of a valve of FIG. 5-1 in a closed configuration;

FIG. 6-1 is a schematic side view of an embodiment of an interior inlet, FIG. 6-2 is a schematic side view of another embodiment of an interior inlet, and FIG. 6-3 is a schematic side view of yet another embodiment of an interior inlet;

FIG. 8-1 is a transverse cross-sectional view of an embodiment of a valve in a closed configuration, and FIG. 8-2 is a transverse cross-sectional view of the embodiment of a valve of FIG. 8-1 in a partially open configuration;

FIG. 9-1 is a transverse cross-sectional view of another embodiment of a valve in a closed configuration, and FIG. 9-2 is a transverse cross-sectional view of the embodiment of a valve of FIG. 9-1 in a partially open configuration;

FIG. 12-1 is a longitudinal cross-sectional view of an embodiment of a valve with axial grooves in a first configuration, and FIG. 12-2 is a longitudinal cross-sectional view of the embodiment of a valve of FIG. 12-1 in a second configuration;

FIG. 14-1 is a longitudinal cross-sectional view of an embodiment of a longitudinally translatable valve in a closed configuration, and FIG. 14-2 is a longitudinal cross-sectional view of the embodiment of a valve of FIG. 14-1 in an open configuration;

FIG. 16-1 is a longitudinal cross-sectional view of an embodiment of a valve with a longitudinally translatable interior body in a first configuration, and FIG. 16-2 is a longitudinal cross-sectional view of the embodiment of a valve of FIG. 16-1 in a second configuration;

FIG. 18-1 is a longitudinal cross-sectional view of an embodiment of a valve with a longitudinally translatable interior body with a plurality of interior necks in a first configuration, and FIG. 18-2 is a longitudinal cross-sectional view of the embodiment of a valve of FIG. 18-1 in a second configuration;

FIG. 20-1 is a transverse cross-sectional view of an embodiment of a wheel, FIG. 20-2 is transverse cross-sectional view of another embodiment of a wheel, FIG. 20-3 is a perspective view of yet another embodiment of a wheel, FIG. 20-4 is an axial view of a further embodiment of a wheel, and FIG. 20-5 is an axial view of a yet further embodiment of a wheel;

FIG. 28-1 is an exploded perspective view of an embodiment of a downhole tool with a system including a turbine, electronics package, and a valve; and FIG. 28-2 is an assembled perspective view of the embodiment of a downhole tool of FIG. 28-1; and FIG. 29-1 is a side view of the embodiment of a downhole tool of FIG. 28-2, FIG. 29-2 is a side cross-sectional view of the embodiment of a downhole tool of FIG. 28-2 through the turbine, and FIG. 29-3 is a side cross-sectional view of the embodiment of a downhole tool of FIG. 28-2 through the valve and steering pad.

DETAILED DESCRIPTION

This disclosure generally relates to devices, systems, and methods for removing material from a formation. More particularly, the present disclosure relates to embodiments of drilling systems including one or more devices for controlling the flow of a suspension through the drilling system.

Figure 1:
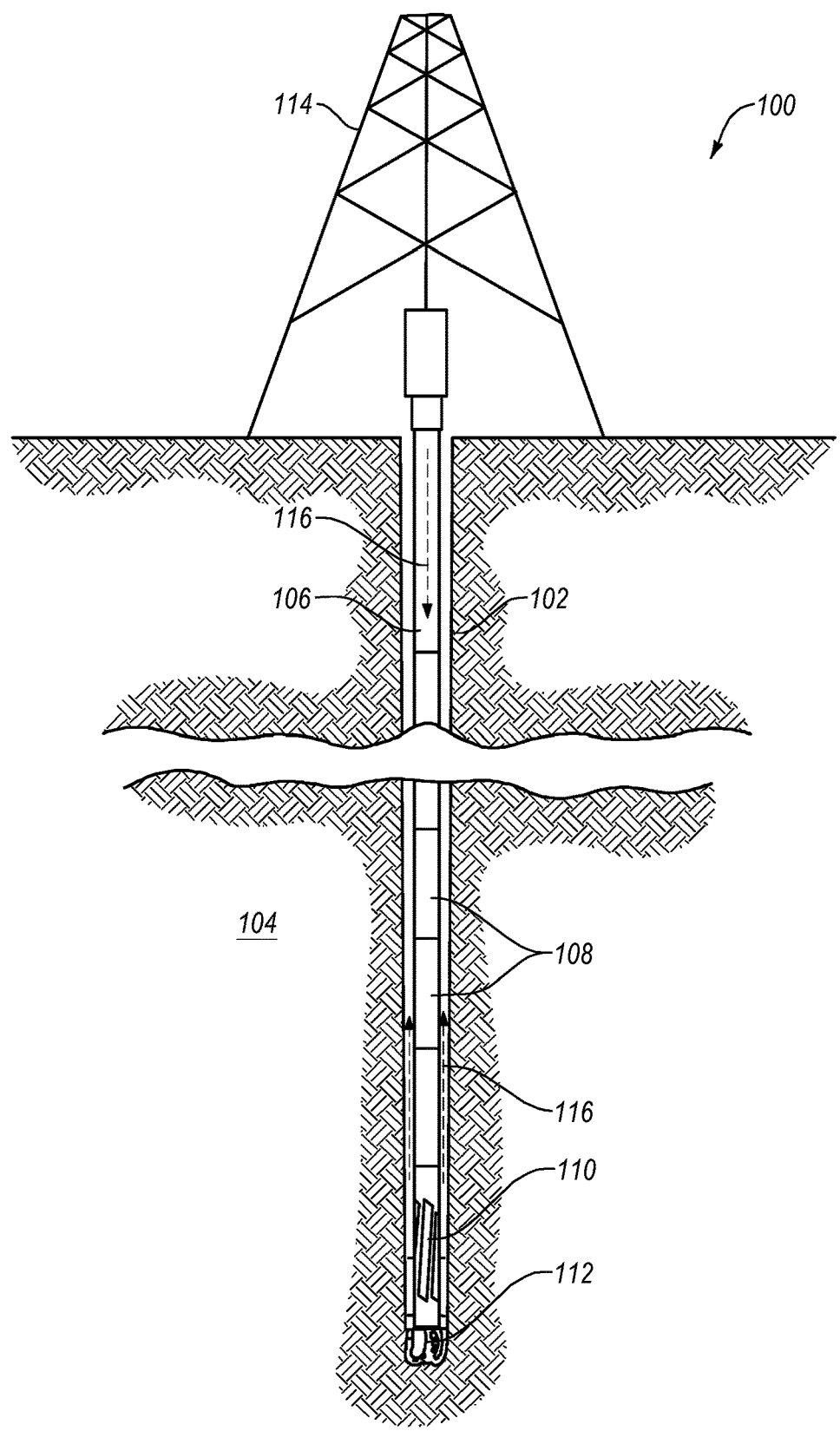
FIG. 1 is a side cross-sectional schematic view of an embodiment of a drilling system.

FIG. 1 shows one example of a drilling system 100 for forming a wellbore 102 in an earth formation 104. The drilling system 100 includes a drill string 106 which extends downward into the wellbore 102. The drill string 106 may include a series of segments of drill pipe 108 and a bottom-hole assembly ("BHA") including one or more downhole tools 110 attached to a downhole end portion of drill string 106. The BHA may include a bit 112 for drilling, milling, reaming, or performing other cutting operations within the wellbore.

The drill string 106 may include several joints of drill pipe 108 connected end-to-end through tool joints. The drill string 106 transmits drilling fluid 116 through a central bore and may optionally transmit torque from the drill rig 114 to the downhole tool 110. In some embodiments, the drill string 106 may further include additional components such as subs, pup joints, etc. The drill string 106 may include slim drill pipe, coiled tubing, or other materials that transmit drilling fluid through a central bore, which may not transmit rotational power. In some embodiments, where the bit 112 is rotated, a downhole motor (e.g., a positive displacement motor, turbine-driven motors, electric motor, etc.) may be included in the drill string 106 and/or BHA. The drill string 106 provides a hydraulic passage through which drilling fluid 116 is pumped from the surface. The drilling fluid 116 discharges through nozzles, jets, or other orifices in the bit 112 (or other components of the drill string 106 or downhole tools 110) for the purposes of cooling the bit 112 and cutting structures thereon, for lifting cuttings out of the wellbore 102 as downhole operations are performed, or for other purposes (e.g., cleaning, powering a motor, etc.). The nozzles, jets, or other orifices may be of a predetermined size and/or shape.

In some embodiments, the BHA may include the bit 112 or other downhole tools 110. Examples of additional BHA components include drill collars; stabilizers; measurement-while-drilling ("MWD") tools, logging-while-drilling ("LWD") tools, or other measurement tools, downhole motors, underreamers, section mills, hydraulic disconnects, jars, vibration or dampening tools, other components, or combinations of the foregoing. For example, the other measurement tools may include accelerometers to measure the movement of the bit 112 and/or a torque meter to measure forces on the bit 112.

In general, the drilling system 100 may include other drilling components and accessories, such as special valves (e.g., kelly cocks, blowout preventers, and safety valves). Additional components included in the drilling system 100 may be considered a part of the drill string 106, a part of the BHA, or a part of the drilling rig 114 depending on their locations or functions in the drilling system 100. In some embodiments, one or more components may actuate through force or energy provided by the drilling fluid 116. In some embodiments, a flow of the drilling fluid 116 may be directed by one or more valves selectively opened or closed.

Figure 2:
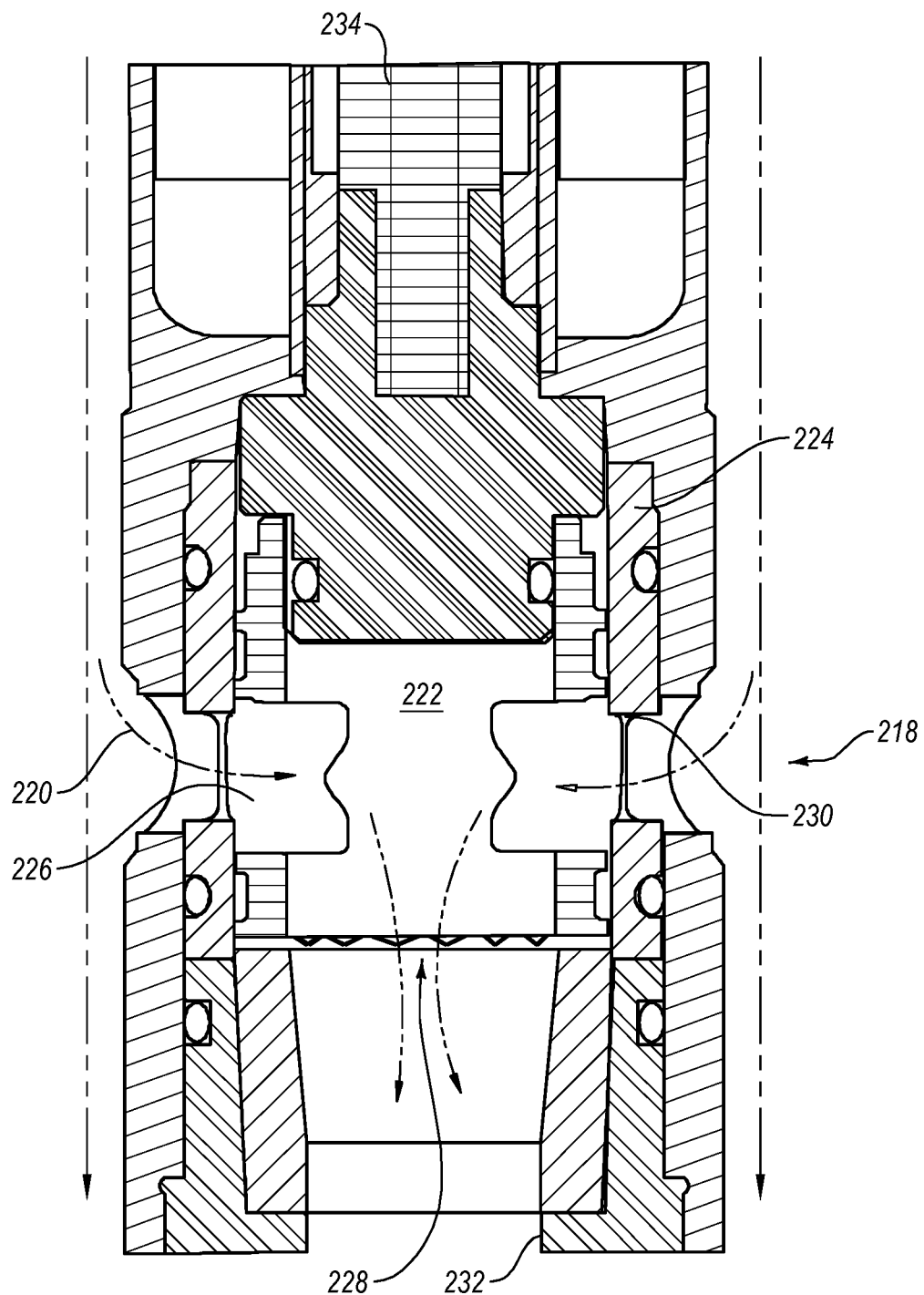
FIG. 2 is a side cross-sectional view of an embodiment of a valve.

Referring to FIG. 2, an embodiment of a valve that may direct fluid flow within a drilling system is shown, according to some embodiments of the present disclosure. In some embodiments, a valve 218 configured to direct a valve fluid 220 may include an interior body 222 and an exterior body 224. In some embodiments, the valve fluid 220 may be a drilling fluid, such as the drilling fluid 116 described in relation to FIG. 1. In other embodiments, the valve fluid 220 may be a hydraulic fluid used to actuate one or more devices in a downhole environment. For example, the valve fluid 220 may be a hydraulic fluid that is used to pressurize one of more chambers to actuate a steering pad in a steerable tool. In other examples, the fluid may be any other downhole fluid such as production fluid.

The interior body 222 may include an interior inlet 226 and an interior outlet 228 in fluid communication through which the valve fluid 220 may flow. The exterior body 224 may include an exterior inlet 230 and an exterior outlet 232 that may be in fluid communication to allow the valve fluid 220 to flow. In some embodiments, the interior inlet 226 and exterior inlet 230 may be selectively aligned to allow valve fluid 220 through the valve 218. In other embodiments, the interior outlet 228 and the exterior outlet 232 may be selectively aligned to allow valve fluid 220 through the valve 218. In at least one embodiment, both the interior inlet 226 and exterior inlet 230 and the interior outlet 228 and the exterior outlet 232 may be selectively aligned to allow valve fluid 220 through the valve 218.

The interior body 222 and/or exterior body 224 of the valve 218 may be moved relative to one another using a valve actuator 234. In some embodiments, the valve actuator 234 may be an electric motor, such as an electromagnetic transducer. In other embodiments, the valve actuator 234 may be a mechanical linkage. In yet other embodiments, the valve actuator 234 may be any rotational and/or axial motor. For example, in some embodiments, actuation of the valve 218 may occur by rotating the interior body 222 and the exterior body 224 relative to one another. In other embodiments, actuation of the valve 218 may occur by linearly translating the interior body 222 and the exterior body 224 relative to one another.

In some embodiments, a valve according to the present disclosure may be free of lubricants or associated fluid seals to seal in the lubricants. In order to operate free of lubricants, the adjacent surfaces may include materials to reduce friction and/or wear therebetween. For example, adjacent surfaces may include PCD or other ultrahard material to reduce the coefficient of friction and increase the wear-resistance of components compared to conventional valves. In other embodiments, a valve according to the present disclosure may reduce the forces required to move the valve between an open configuration and a closed configuration by radially and/or axially balancing forces and/or fluid pressures on the valve. Balancing forces may reduce the normal force between the exterior and interior bodies, thereby reducing frictional forces.

In some embodiments, a valve according to the present disclosure may remain balanced while experiencing pressure differential across the valve in a range having an upper value, a lower value, or upper and lower values including any of 500 kPa, 1.0 MPa, 1.0 MPa, 3.0 MPa, 4.0 MPa, 5.0 MPa, 6.0 MPa, 7.0 MPa, 8.0 MPa, 9.0 MPa, 10.0 MPa, 11.0 MPa, or any values therebetween. For example, the pressure differential across a valve may be greater than 500 kPa. In other examples, the pressure differential across a valve may be less than 11.0 MPa. In yet other examples, the pressure differential across a valve may be in a range of 500 kPa to 11.0 MPa.

The pressure differential may be less when the valve is in an open configuration. In some embodiments, the valve may allow for pressure differentials in an open configuration in a range having an upper value, a lower value, or upper and lower values including any of 120 kPa, 130 kPa, 140 kPa, 150 kPa, 160 kPa, 170 kPa, 180 kPa, 190 kPa, 200 kPa, or any values therebetween. For example, a valve according to the present disclosure may allow for pressure differentials greater than 120 kPa in an open configuration. In other examples, a valve according to the present disclosure may allow for pressure differentials less than 200 kPa in an open configuration. In yet other examples, a valve according to the present disclosure may allow for pressure differentials in a range of 120 kPa to 200 kPa in an open configuration. In at least one example, in an open configuration, a valve according to the present disclosure may allow for flow rates up to 114 liters per minute (lpm) of fluid therethrough while incurring a 170 kPa pressure differential across the valve.

Figures 2, 3:
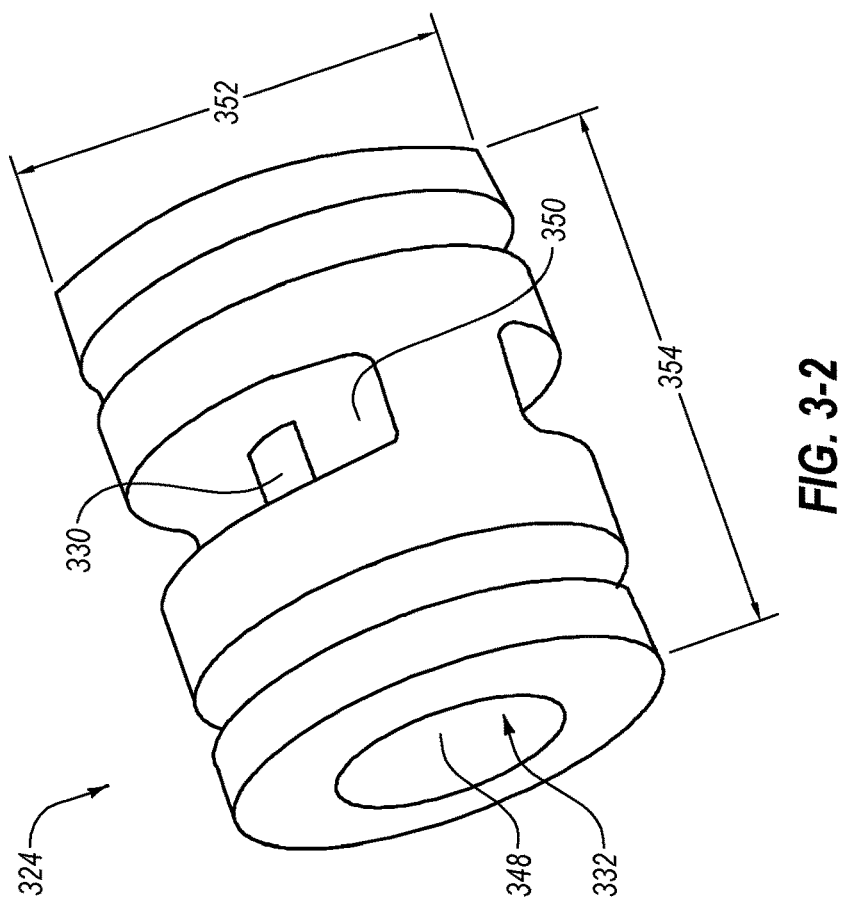
Figures 1, 3:
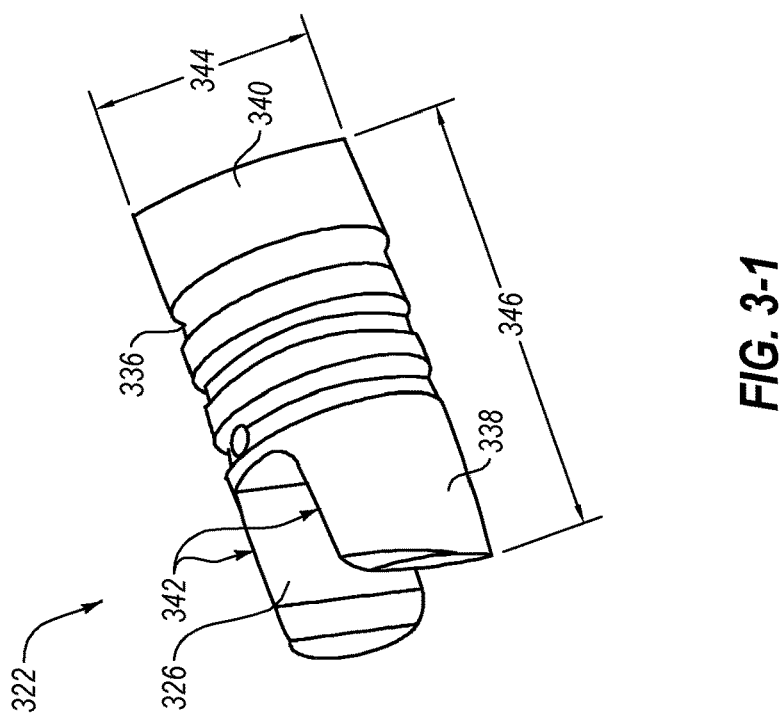

Referring to FIG. 3-1, in some embodiments, the interior body 322 may include a generally cylindrical shape. The interior body 322 may include at least one channel 336 circumferentially positioned about the outer surface of the interior body 322. In some embodiments, the interior body 322 may include three channels 336. In other embodiments the interior body 322 may include one, two, three, four, or five channels 336. In some embodiments, the channels 336 may assist in axially and/or radially balancing fluid pressures in a static state of the valve, reducing rotational friction.

In some embodiments, the interior body 322 may include a plurality of tabs 338. The tabs may protrude longitudinally from the interior body 322 and may be positioned circumferential at rotational intervals. In some embodiments the interior body 322 may include two tabs 338. In other embodiments, the interior body 322 may include six tabs 338. In yet other embodiments, the interior body 322 may include two, three, four, five, six, seven, or eight tabs 338. Between each tab 338 is an interior inlet 326. In some embodiments, the tabs 338 are spaced at equal angular intervals about a rotational axis of the interior body 322. For example, the embodiment of an interior body 322 illustrated in FIG. 3-1 has two tabs 338 positioned at 180° intervals about the rotational axis of the interior body 322. In other embodiments, the tabs 338 may be positioned at unequal intervals about a rotational axis.

In some embodiments, the entire interior body 322 may include PCD or other ultrahard material. In some embodiments, the interior body 322 may be completely formed as one continuous block of PCD or other ultrahard material. In other embodiments, the interior body 322 may be formed from one continuous block of PCD or other ultrahard material, with fine details machined into the continuous block after forming. For example, the at least one channel 336 may be machined into place after the interior body 322 is formed.

In other embodiments, the interior body 322 may include a plurality of segments. Each segment may be formed from PCD or other ultrahard material, and then later attached to one another to form the interior body 322. For example, the plurality of tabs 338 may be formed separately from the remainder of the interior body 322. Following fabrication of the parts, the plurality of tabs 338 may be connected to form the interior body 322 using a mechanical connection, weld, braze, or other connection type. Other examples include manufacturing the generally cylindrical section 340 of the interior body 322 in a plurality of pieces. Each piece of the generally cylindrical section 340 may be attached together using a mechanical connection, braze, weld or other connection type. In some embodiments, the plurality of pieces of the generally cylindrical section 340 may include a fillet at one end. When filleted ends are matched to each other, the matching filleted ends will form a channel 336.

In some embodiments, a portion of the interior body 322 that is less than the entire interior body 322 may include PCD or other ultrahard material. For example, in some embodiments, the interior inlet edges 342 may include PCD or other ultrahard material. In other embodiments, only one interior inlet edge 342 may include PCD or other ultrahard material. In other embodiments, the outer surface of the interior body 322 may include PCD or other ultrahard material. In some embodiments, the outer surface of the generally cylindrical section 340 of the interior body 322 may include PCD or other ultrahard material.

In some embodiments, the PCD or other ultrahard material may be formed on a substrate, such as tungsten carbide (WC). In other embodiments, the PCD or other ultrahard material may be an insert into the interior body 322, the insert configured to be replaced as needed. In still other embodiments, the plurality of tabs 338 may be formed from PCD or other ultrahard material, while the remainder of the interior body 322 is formed from a separate material such as WC.

In some embodiments, the interior body 322 may have an interior body width 344 of less than 5 cm. In other embodiments, the interior body width 344 may be in a range having an upper value, a lower value, or upper and lower values including any of 0.5 cm, 1 cm, 2 cm, 3 cm, 4 cm, 5 cm, 6 cm, 7 cm, 8 cm, 9 cm, 10 cm, or any value therebetween. For example, the interior body width 344 may be greater than 0.5 cm. In other examples, the interior body width 344 may be less than 10 cm. Still other examples include an interior body width 344 in a range between 0.5 cm and 10 cm.

In some embodiments, the interior body 322 may have an interior body length 346 of about 15 cm. In other embodiments, the interior body length 346 may be in a range having an upper value, a lower value, or upper and lower values including any of 2 cm, 3 cm, 4 cm, 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, 20 cm, or any value therebetween. For example, the interior body length 346 may be greater than 2 cm. In other examples, the interior body length 346 may be less than 20 cm. Still other examples include an interior body length 346 in a range between 2 cm and 20 cm.

Referring now to FIG. 3-2, in some embodiments the exterior body 324 may include an exterior inlet 330 and an exterior outlet 332. In some embodiments, the exterior body 324 may include a chamber 348 located inside the exterior body 324. In some embodiments, the chamber 348 may provide fluid communication between the exterior inlet 330 and the exterior outlet 332. In some embodiments, the chamber 348 may include a generally cylindrical shape. In some embodiments, the exterior body 324 may include multiple exterior inlets 330. For example, the exterior body 324 may include two exterior inlets 330. In other examples, the exterior body 324 may include three, four, five, six, seven, or eight exterior inlets 330. In some embodiments, the exterior inlets 330 may be positioned circumferentially about the exterior body 324 at equal angular intervals. In other embodiments, the exterior inlets 330 may be positioned circumferentially about the exterior body 324 at unequal angular intervals.

In some embodiments, the exterior body 324 may include a recess 350. The exterior inlet 330 may be located within the recess 350. In some embodiments, the number of recesses 350 may match the number of exterior inlets 330. In some embodiments, the recess 350 may be recessed through the exterior body 324 by 50% of the radius of the exterior body 324. In other embodiments, the recess 350 may be in a range having an upper value, a lower value, or upper and lower values including any of 10%, 20%, 30%, 40%, 50%, 60%, 70% of the radius of the exterior body 324, or any value therebetween. For example, the recess 350 may be greater than 10% of the radius of the exterior body 324. In other examples, the recess 350 may be less than 70% of the radius of the exterior body 324. Still other examples include a recess 350 recessed in a range between 10% and 70% of the radius of the exterior body 324.

Referring to FIG. 3-2, in some embodiments the entire exterior body 324 may include PCD or other ultrahard material. In some embodiments, the exterior body 324 may be completely formed as one continuous block of PCD or other ultrahard material. In other embodiments, the exterior body 324 may be formed from one continuous block of PCD or other ultrahard material, with features machined into the continuous block after forming. For example, the recess 350 may be machined into the exterior body 324 after the continuous block of PCD or other ultrahard material is formed.

In other embodiments, the exterior body 324 may include a plurality of segments. Each segment may be formed from PCD or other ultrahard material, and then later attached each other to form the exterior body 324. For example, the exterior body 324 may be formed in three segments: two segments located opposite the recess 350, and a recess segment. Each of the three segments may then be attached together using a mechanical connection, braze, weld or other connection type. In other embodiments, the exterior body 324 may include two, three, four, five, or six segments.

In some embodiments, at least a portion of the chamber 348 may be lined with PCD or other ultrahard material. For example, the inner surface of the chamber 348 may include a removable PCD insert. The removable PCD insert may be replaced as needed without replacing the entire exterior body 324. The removable PCD insert may be attached to the chamber 348 using a mechanical connection, braze, weld or other connection type.

In some embodiments, the exterior body 324 may have an exterior body width 352 of less than 7 cm. In other embodiments, the exterior body width 352 may be in a range having an upper value, a lower value, or upper and lower values including any of 0.5 cm, 1 cm, 2 cm, 3 cm, 4 cm, 5 cm, 6 cm, 7 cm, 8 cm, 9 cm, 10 cm, 11 cm, 12 cm, or any value therebetween. For example, the exterior body width 352 may be greater than 0.5 cm. In other examples, the exterior body width 352 may be less than 12 cm. Still other examples include an exterior body width 352 in a range between 0.5 cm and 12 cm.

In some embodiments, the exterior body 324 may have an exterior body length 354 of about 15 cm. In other embodiments, the exterior body length 354 may be in a range having an upper value, a lower value, or upper and lower values including any of 2 cm, 3 cm, 4 cm, 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, 20 cm, or any value therebetween. For example, the exterior body length 354 may be greater than 2 cm. In other examples, the exterior body length 354 may be less than 20 cm. Still other examples include an exterior body length 354 in a range between 2 cm and 20 cm.

The shape of the recess 350 may influence the fluid dynamics of the valve fluid entering the exterior and/or interior inlets and through the valve. FIG. 4-1, FIG. 4-2, and FIG. 4-3 illustrate additional embodiments of a recess 450-1, 450-2, 450-3 in an exterior body 424-1, 424-2, 424-3. In some embodiments, such as the embodiment illustrated in FIG. 4-1, a recess length 458-1 of a recess surface 456-1 may remain constant from the exterior surface of the exterior body 424-1 to the exterior inlet 430-1. In yet other embodiments, such as that shown in FIG. 4-3, a recess length 458-3 may decrease from the exterior surface of the exterior body 424-3 to the exterior inlet 430-3.

Figures 1, 4:
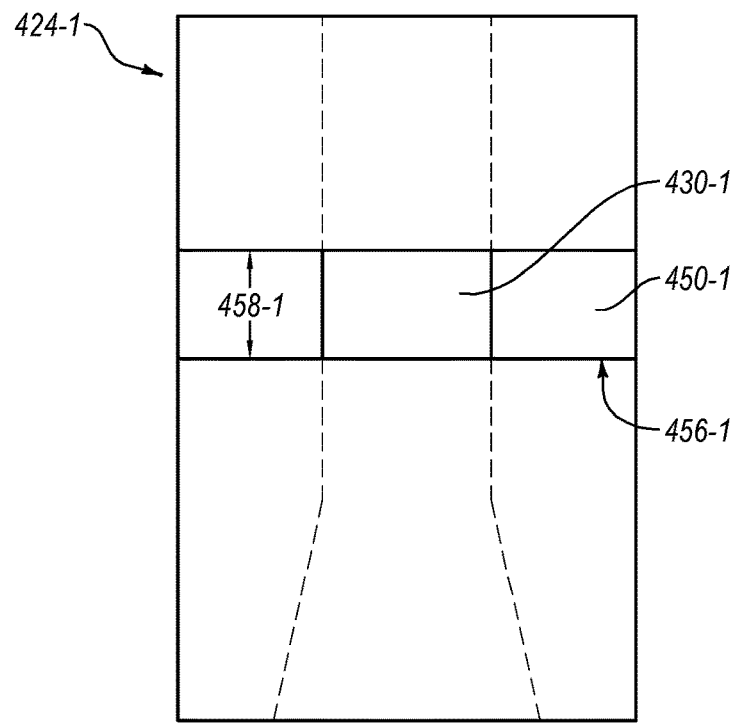
Figures 2, 4:
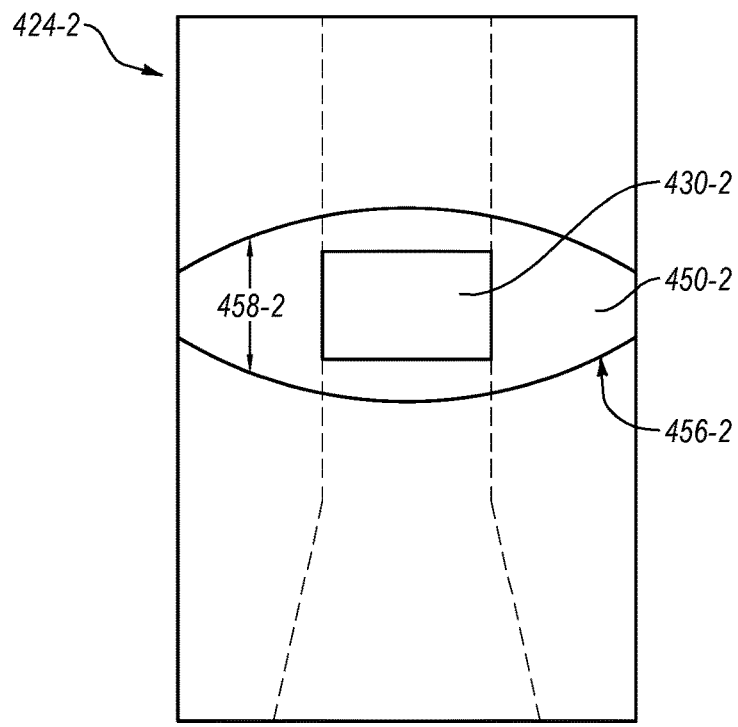
Figures 3, 4:
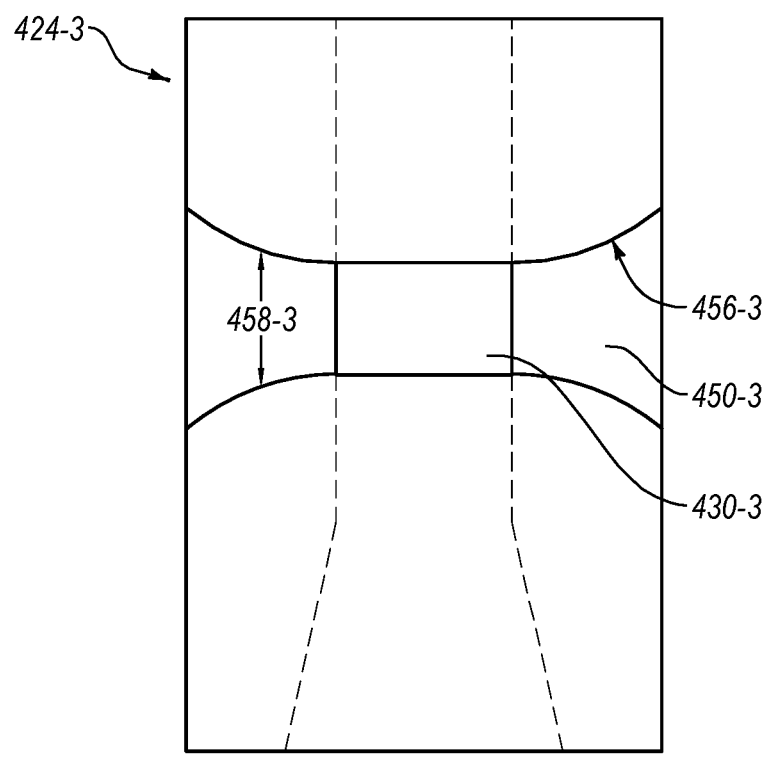

Referring to FIG. 4-2, the recess length 458-2 of a recess surface 456-2 may increase from the exterior surface of the exterior body 424-2 toward the exterior inlet 430-2. In some embodiments, the recess length 458-2 may be 50% wider than the width of the exterior inlet 430-2 at the exterior inlet 430-2. In other embodiments, the recess length 458-2 may be in a range having an upper value, a lower value, or upper and lower values including any of 10%, 20%, 30%, 40%, 50%, 60%, 70%, 80%, 90%, 100% wider the width of the exterior inlet 430-2 at the exterior inlet 430-2, or any value therebetween. For example, the recess length 458-2 may be greater than 10% wider than the width of the exterior inlet 430-2 at the exterior inlet 430-2. In other examples, the recess length 458-2 may be less than 100% wider than the width of the exterior inlet 430-2 at the exterior inlet 430-2. Still other examples include a recess length 458-2 in a range between 10% and 100% wider than the width of the exterior inlet 430-2 at the exterior inlet 430-2.

Referring to FIG. 4-3, a recess length 458-3 may decrease from the exterior surface of the exterior body 424-3 to the exterior inlet 430-3. In some embodiments, the recess 450-3 may have a recess length 458-3 that decreases toward the center of the exterior inlet 430-3, until at the center of the recess 450-3 the recess length 458-3 is approximately the same width as the width of the exterior inlet 430-3. In some embodiments, the recess length 458-3 at the transverse edge (i.e., furthest from the exterior inlet 430-3) of the recess 450-3 may be 50% wider than the width of the exterior inlet 430-3. In other embodiments, the recess length 458-3 at the start of the recess 450-3 may be in a range having an upper value, a lower value, or upper and lower values including any of 10%, 20%, 30%, 40%, 50%, 60%, 70%, 80%, 90%, 100% wider the width of the exterior inlet 430-3, or any value therebetween. For example, the recess length 458-3 at the start of the recess 450-3 may be greater than 10% wider than the width of the exterior inlet 430-3. In other examples, the recess length 458-3 at the start of the recess 450-3 may be less than 100% wider than the width of the exterior inlet 430-3. Still other examples include a recess length 458-3 at the start of the recess 450-3 in a range between 10% and 100% wider than the width of the exterior inlet 430-3.

Figures 1, 20:
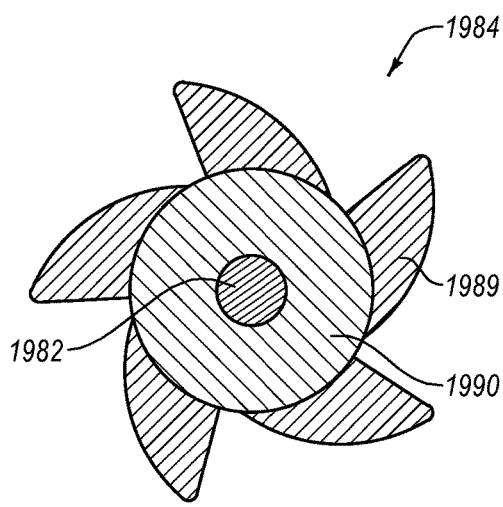
Figures 2, 20:
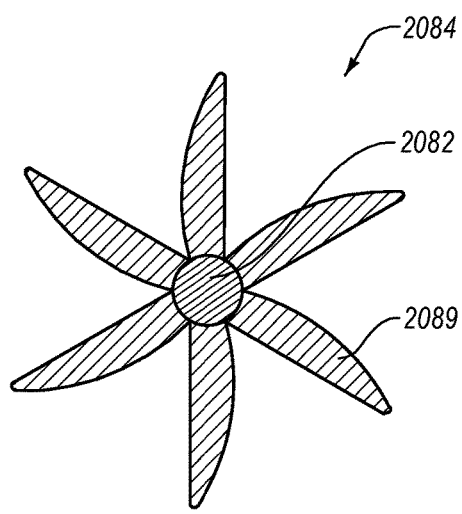
Figures 3, 20:
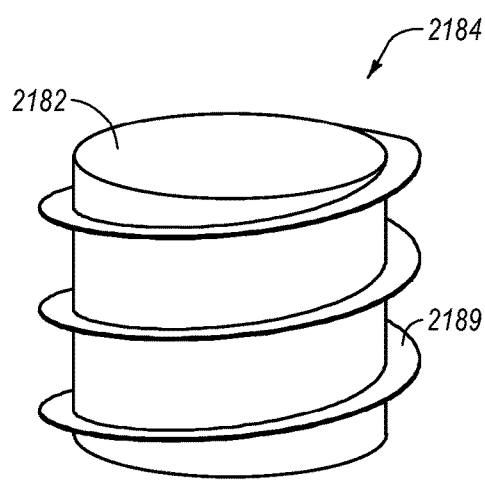
Figures 4, 20:
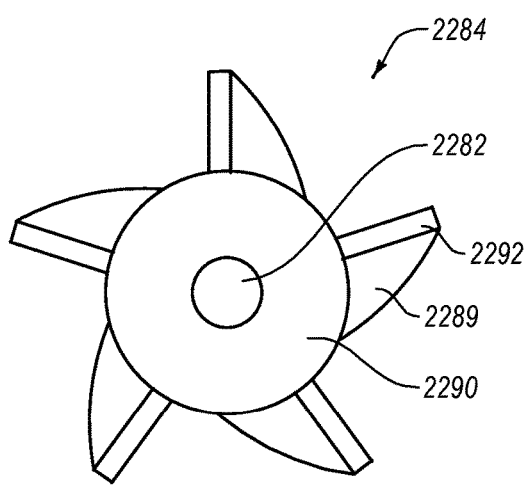
Figures 5, 20:
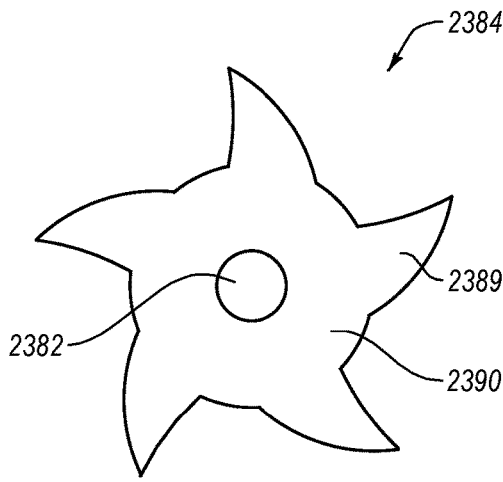

A longitudinal cross-sectional view of an assembled valve 518 is shown in FIG. 5-1 and FIG. 5-2. Referring to FIG. 5-1, an interior body 522 is shown (with solid lines) positioned into a chamber 548 of an exterior body 524 (shown in dash-lines). In some embodiments, the interior body 522 is complimentarily shaped to the chamber 548. For example, both the interior body 522 and the chamber 548 may have a generally cylindrical shape. An exterior inlet 530 is located in the wall of the exterior body 524. An exterior outlet 532 is shown at the bottom of the exterior body 524. The interior body 522 may be movable from an open configuration and a closed configuration. In some embodiments the interior body 522 may rotate within the chamber 548 around a valve rotational axis 560. In other embodiments, the interior body 522 may be linearly translatable within the chamber 548.

In some embodiments, the interior body 522 may include a plurality of circumferentially disposed tabs 538 and a plurality of interior inlets 526. In the open configuration illustrated in FIG. 5-1, at least one interior inlet 526 of the plurality of interior inlets 526 may rotationally and/or longitudinally align with the exterior inlet 530. A valve fluid entering the exterior inlet 530 may pass through the interior inlet 526 and into the chamber 548. The valve fluid may then pass through the chamber 548 and out the exterior outlet 532.

As described herein, in some embodiments, the valve fluid may include drilling mud. It will be understood to those with skill in the art that drilling mud may include a mixture of different materials. In some embodiments, the drilling mud may include an oil based mud. In other embodiments, the drilling mud may include a water based mud. In still other embodiments, the drilling mud may include some of the follow materials: quartz sand, drill cuttings, magnetite, barite, bentonite.

In some embodiments, the fluid may have added suspended solids added by an operator by weight in a range having an upper value, a lower value, or upper and lower values including any of 0.5%, 1.0%, 1.5%, 2.0%, 2.5%, 3.0%, 3.5%, 4.0%, 4.5%, 5.0%, 5.5%, 6.0%, 7.0%, 8.0%, 9.0%, 10.0%, 15.0%, 20.0%, 25.0%, 50.0%, 75.0%, 100%, 150%, 200%, or any values therebetween. For example, the fluid may have added suspended solids by weight greater than 0.5%. In other examples, the fluid may have added suspended solids by weight less than 200%. In yet other examples, the fluid may have added suspended solids by weight in a range of 0.5% to 200%.

In other embodiments, the fluid may include environmental suspended solids accumulated during use of the downhole tool by weight in a range having an upper value, a lower value, or upper and lower values including any of 0.5%, 1.0%, 3.0%, 5.0%, 7.0%, 9.0%, 11.0%, 13.0%, 15.0%, 20.0%, 25.0%, 30.0%, or any values therebetween. For example, the fluid may have environmental suspended solids by weight greater than 0.5%. In other examples, the fluid may have environmental suspended solids by weight less than 30.0%. In yet other examples, the fluid may have environmental suspended solids by weight in a range of 0.5% to 30.0%.

In some embodiments, the exterior outlet 532 may be coaxial with the valve rotational axis 560. In other embodiments, the exterior outlet 532 may be located in a longitudinal direction relative to the exterior body 524. For example, the exterior outlet 532 may be located in a different longitudinal plane from the exterior inlet 530. Other examples include the exterior outlet 532 located radially around the wall of the exterior body 524, in the same longitudinal plane as the exterior inlet 530 (e.g., radially opposite the exterior inlet 530).

In some embodiments, the interior inlet 526 may be complementarily shaped to the exterior inlet 530. In other embodiments, the interior inlet 526 may be similarly shaped to the exterior inlet 530, but the interior inlet 526 may have a larger inlet area. In still other embodiments, the interior inlet 526 may be similarly shaped to the exterior inlet 530, but the interior inlet 526 may have a smaller inlet area. In other embodiments, the interior inlet 526 may include a larger inlet area than the exterior inlet 530. In yet other embodiments the interior inlet 526 may include a smaller inlet area than the exterior inlet 530. In some embodiments, the interior inlet 526 may include a larger interior inlet width 562 than an exterior inlet width 566 of the exterior inlet 530. In other embodiments, the interior inlet 526 may include a smaller interior inlet width 562 than an exterior inlet width 566 of the exterior inlet 530. In some embodiments, the interior inlet 526 may include an interior inlet height 564 that is larger than an exterior inlet height 568 of the exterior inlet 530. Still other embodiments may include an interior inlet 526 with an interior inlet height 564 smaller than an exterior inlet height 568 of the exterior inlet 530.

The exterior inlet 530 and the interior inlet 526 have a maximum inlet dimension (e.g., the diagonal direction of the rounded square-shaped inlets of FIGS. 5-1 and 5-2). In some embodiments, the maximum inlet dimension may be about 4 mm. In other embodiments, the maximum inlet dimension may be in a range having an upper value, a lower value, or upper and lower values including any of 2 mm, 3 mm, 4 mm, 5 mm, 6 mm, 7 mm, or any value therebetween. For example, the maximum inlet dimension may be greater than 2 mm. In other examples, the maximum inlet dimension may be less than 7 mm. Still other examples include a maximum inlet dimension in a range between 2 mm and 7 mm.

FIG. 5-1 and FIG. 5-2 illustrate the valve 518 in an open configuration and a closed configuration. The interior body 522 and the exterior body 524 are movable relative to one another to move between the open configuration and closed configuration. As described herein, some embodiments of a valve 518 may include ultrahard materials, such as PCD, e.g., to increase wear-resistance and/or reduce a coefficient of friction between the adjacent and/or contacting components of the valve 518.

In some embodiments, the portion of the interior body 522 including PCD or other ultrahard material and the portion of the exterior body 524 including PCD or other ultrahard material are adjacently disposed. For example, in some embodiments, the exterior surface of the interior body 522 includes PCD or other ultrahard material and the surface of the chamber 548 includes PCD or other ultrahard material. When the interior body 522 is inserted into the chamber 548, the PCD or other ultrahard material of the exterior surface of the interior body 522 and the PCD or other ultrahard material of the surface of the chamber 548 are positioned adjacent and/or in contact with one another.

In some embodiments, moving the interior body 522 including PCD or other ultrahard material adjacent to the chamber 548 including PCD or other ultrahard material may encounter lower friction that conventional metal or composite components. For example, in some embodiments, rotating the interior body 522 from the open configuration to the closed configuration may require 0.1 Newton-meters (N-m) of torque or less when the valve is exposed to fluid pressure differentials such as those described in relation to FIG. 2. In other embodiments, rotating the interior body 522 from the open configuration to the closed configuration may require a torque in a range having an upper value, a lower value, or upper and lower values including any of 0.025 N-m, 0.05 N-m, 0.075 N-m, 0.1 N-m, 0.125 N-m, 0.15 N-m, 0.175 N-m, 0.2 N-m, 0.225 N-m, 0.25 N-m, 0.275 N-m, 0.3 N-m, or any value therebetween. For example, rotating the interior body 522 from the open configuration to the closed configuration may require greater than 0.025 N-m of torque. In other examples, rotating the interior body 522 from the open configuration to the closed configuration may require less than 0.3 N-m of torque. Still other examples include rotating the interior body 522 from the open configuration to the closed configuration with a torque in a range between 0.025 N-m and 0.3 N-m.

In some embodiments, rotating the interior body 522 from the closed configuration to the open configuration may require 0.1 N-m of torque when the valve is exposed to fluid pressure differentials such as those described in relation to FIG. 2. In other embodiments, rotating the interior body 522 from the closed configuration to the open configuration may require a torque in a range having an upper value, a lower value, or upper and lower values including any of 0.025 N-m, 0.05 N-m, 0.075 N-m, 0.1 N-m, 0.125 N-m, 0.15 N-m, 0.175 N-m, 0.2 N-m, 0.225 N-m, 0.25 N-m, 0.275 N-m, 0.3 N-m, or any value therebetween. For example, rotating the interior body 522 from the closed configuration to the open configuration may require greater than 0.025 N-m of torque. In other examples, rotating the interior body 522 from the closed configuration to the open configuration may require less than 0.3 N-m of torque. Still other examples include rotating the interior body 522 from the closed configuration to the open configuration with a torque in a range between 0.025 N-m and 0.3 N-m.

In some embodiments, rotating the interior body 522 from the open configuration to the closed configuration may take a period of 10 milliseconds (ms). In other embodiments, rotating the interior body 522 from the open configuration to the closed configuration may take a period having an upper value, a lower value, or upper and lower values including any of 5 ms, 6 ms, 7 ms, 8 ms, 9 ms, 10 ms, 11 ms, 12 ms, 13 ms, 14 ms, 15 ms, 20 ms, 25 ms, 30 ms, 35 ms, 40 ms, 45 ms, 50 ms, or any value therebetween. For example, rotating the interior body 522 from the open configuration to the closed configuration may take a period of 5 ms. In other examples, rotating the interior body 522 from the open configuration to the closed configuration may take a period of 15 ms. In yet other examples, rotating the interior body 522 from the open configuration to the closed configuration may take a period of 30 ms. In further examples, rotating the interior body 522 from the open configuration to the closed configuration may take a period of 50 ms. Still other examples include rotating the interior body 522 from the open configuration to the closed configuration over a period in a range between 5 ms and 50 ms.

In some embodiments, rotating the interior body 522 from the closed configuration to the open configuration may take a period of 10 ms. In other embodiments, rotating the interior body 522 from the closed configuration to the open configuration may take a period having an upper value, a lower value, or upper and lower values including any of 5 ms, 6 ms, 7 ms, 8 ms, 9 ms, 10 ms, 11 ms, 12 ms, 13 ms, 14 ms, 15 ms, 20 ms, 25 ms, 30 ms, 35 ms, 40 ms, 45 ms, 50 ms or any value therebetween. For example, rotating the interior body 522 from the closed configuration to the open configuration may take a period of 5 ms. In other examples, rotating the interior body 522 from the closed configuration to the open configuration may take a period of 15 ms. In yet other examples, rotating the interior body 522 from the closed configuration to the open configuration may take a period of 30 ms. In further examples, rotating the interior body 522 from the closed configuration to the open configuration may take a period of 50 ms. Still other examples include rotating the interior body 522 from the closed configuration to the open configuration over a period in a range between 5 ms and 50 ms.

Still referring to FIG. 5-1, the interior body 522 may be inserted into the chamber 548 with a radial clearance between the interior body 522 and the exterior body 524. In some embodiments, the radial clearance may be small enough to prevent solids included in the valve fluid from passing through the radial clearance between the interior body 522 and the chamber 348. In some embodiments, the interior body 522 may have a radial clearance between the interior body 522 and the exterior body 524 of 5 µm. In other embodiments, the radial clearance may have an upper value, a lower value, or upper and lower values including any of 3 µm, 4 µm, 5 µm, 6 µm, 7 µm, 8 µm, 9 µm, 10 µm, or any value therebetween. For example, the radial clearance may be greater than 3 µm. In other examples, the radial clearance may be less than 10 µm. Still other examples include a radial clearance in a range between 3 µm and 10 µm.

Referring now to FIG. 5-2, in the closed configuration, the interior body 522 may be rotated such that a portion of the interior body 522 completely blocks the exterior inlet 530.

In some embodiments, the portion of the interior body 522 that blocks the exterior inlet 530 may be a tab 538. Some embodiments may include an exterior inlet edge 570 and an interior inlet edge 542. In some embodiments, at least a portion of the exterior inlet edge 570 may be parallel to the interior inlet edge 542. For example, the exterior inlet edge 570 may be smaller than the interior inlet edge 542, but the sides of each may be parallel such that a difference between the exterior inlet edge 570 and the interior inlet edge 542 is constant. In at least one example, the lateral sides of the exterior inlet edge 570 and the interior inlet edge 542 are parallel. In other embodiments, at least a portion of the exterior inlet edge 570 may be non-parallel to the interior inlet edge 542. For example, a tab 538 may be tapered in the longitudinal direction, as shown in the embodiment in FIG. 5-2.

Figures 3, 6:
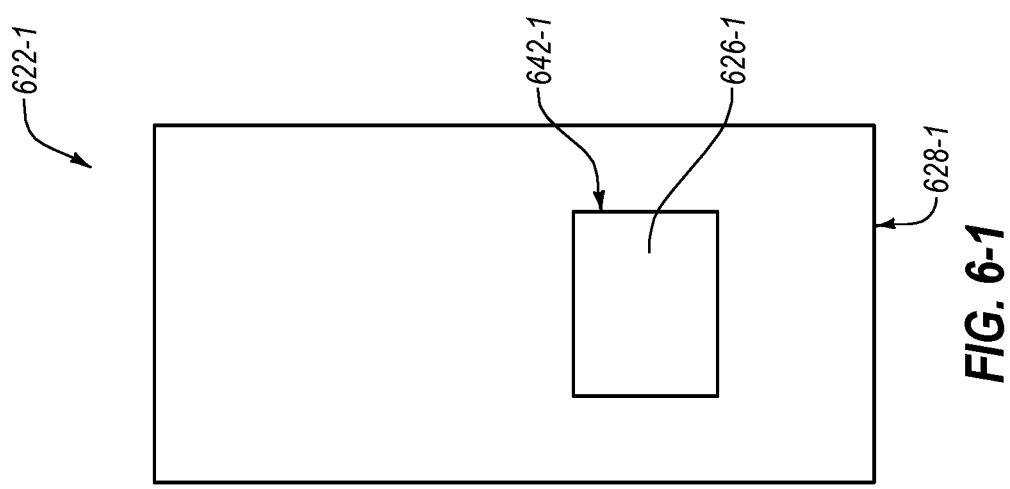
Figures 2, 6:
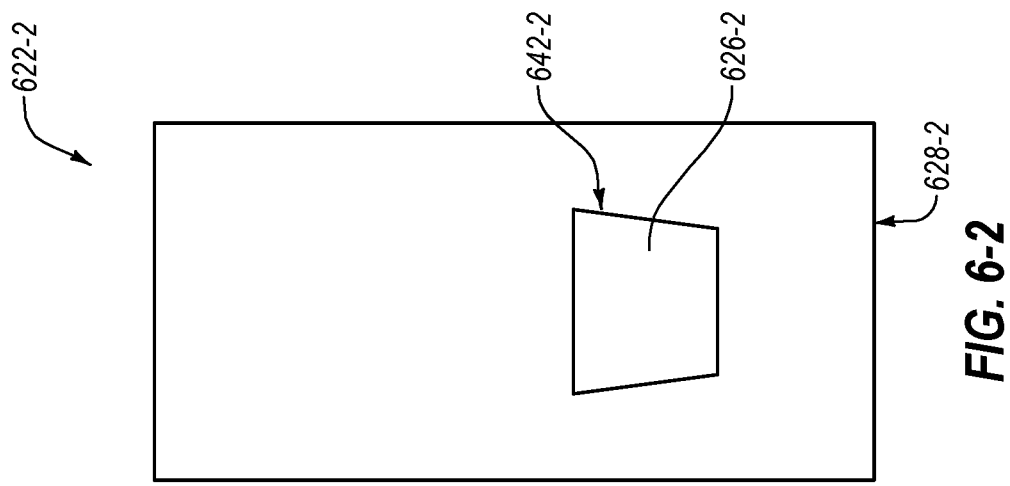
Figures 1, 6:
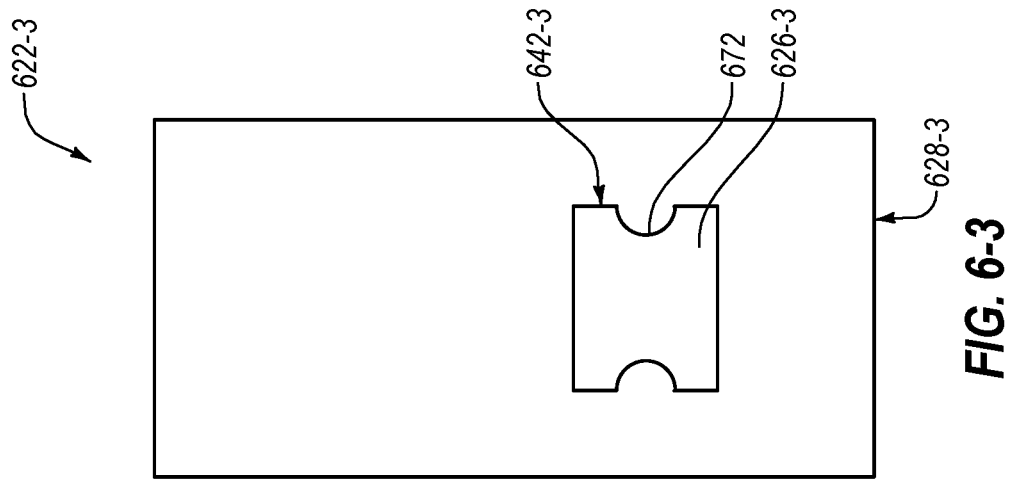

Referring now to FIG. 6-1, in some embodiments, the interior body 622-1 may include an interior inlet 626-1 and an interior outlet 628-1. In some embodiments, the interior inlet 626-1 may be in fluid communication with the interior outlet 628-1 through the interior body 622-1. The interior inlet 626-1 includes an interior inlet edge 642-1. In some embodiments, the interior inlet edge 642-1 may form an outline that is approximately rectangular and/or orthogonal. In other embodiments, the interior inlet edge 642-1 may form an outline that is approximately square.

Referring to FIG. 6-2, in some embodiments of an interior body 622-2, the interior inlet edge 642-2 of the interior inlet 626-2 may form an outline that is polygonal with non-perpendicular corners. For example, the top and bottom of the interior inlet edge 642-2 may be parallel, and the side edges may slant towards each other, as in a trapezoid. In other embodiments, the interior inlet edge 642-2 may form an outline that is a parallelogram. In at least one embodiment, the shape of the interior inlet edge 642-2 may alter the flow of the valve fluid through the interior inlet 626-2 and through a valve including the interior body 622-2.

Referring to FIG. 6-3, in some embodiments, the interior inlet edge 642-3 may form an outline that is at least partially curved and/or non-polygonal. For example, the interior inlet edge 642-3 may include at least one protrusion 672, the at least one protrusion 672 protruding toward the center of the interior inlet 626-3. In some embodiments, the at least one protrusion 672 may be located on axial sides of the interior inlet 626-3. In other embodiments, the at least one protrusion 672 may be located on longitudinal sides of the interior inlet 626-3. Still other embodiments include the at least one protrusion 672 located on both axial and longitudinal sides of the interior inlet 626-3.

Figure 7:
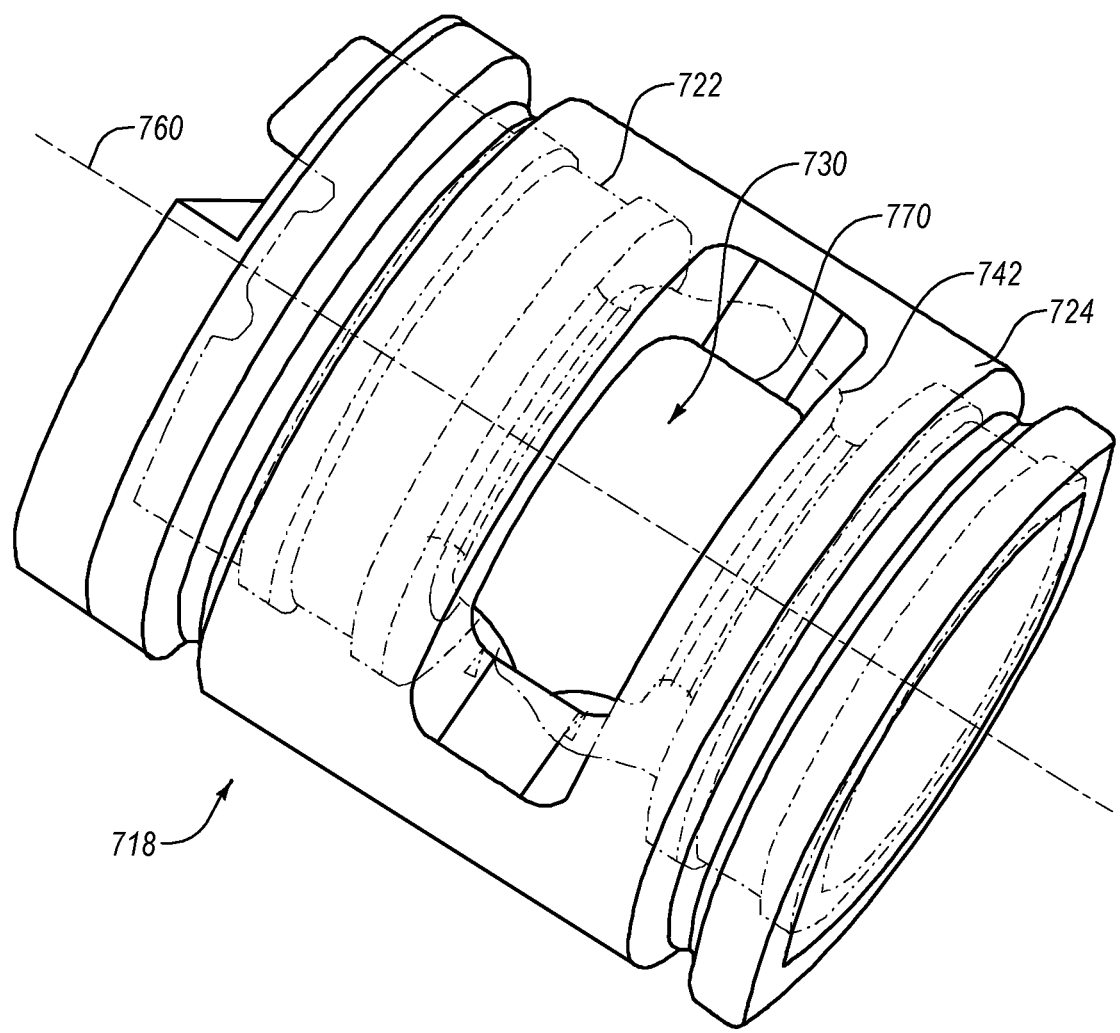
FIG. 7 is a perspective view of an embodiment of a valve in a partially open configuration.

Referring now to FIG. 7, a valve 718 may include an exterior body 724 (shown in solid lines) and an interior body 722 (shown in dashed lines). The exterior body 724 may include an exterior inlet 730. The interior body 722 may include an interior inlet edge 742. In some embodiments, the interior inlet edge 742 may be non-parallel to the exterior inlet edge 770. In some embodiments, as the interior body 722 is rotated along the valve rotational axis 760, the interior inlet edge 742 may intersect the exterior inlet edge 770, creating a balanced fluid pressure differential between the interior and exterior of the valve 718.

Figures 1, 8:
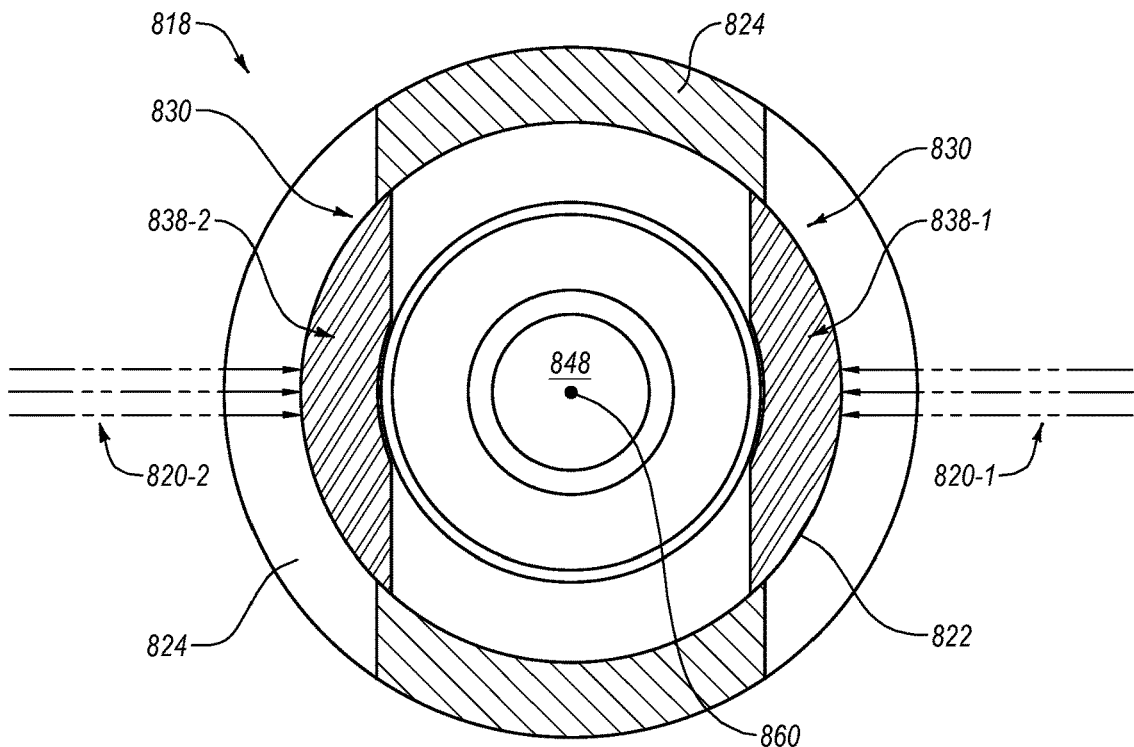
Figures 2, 8:
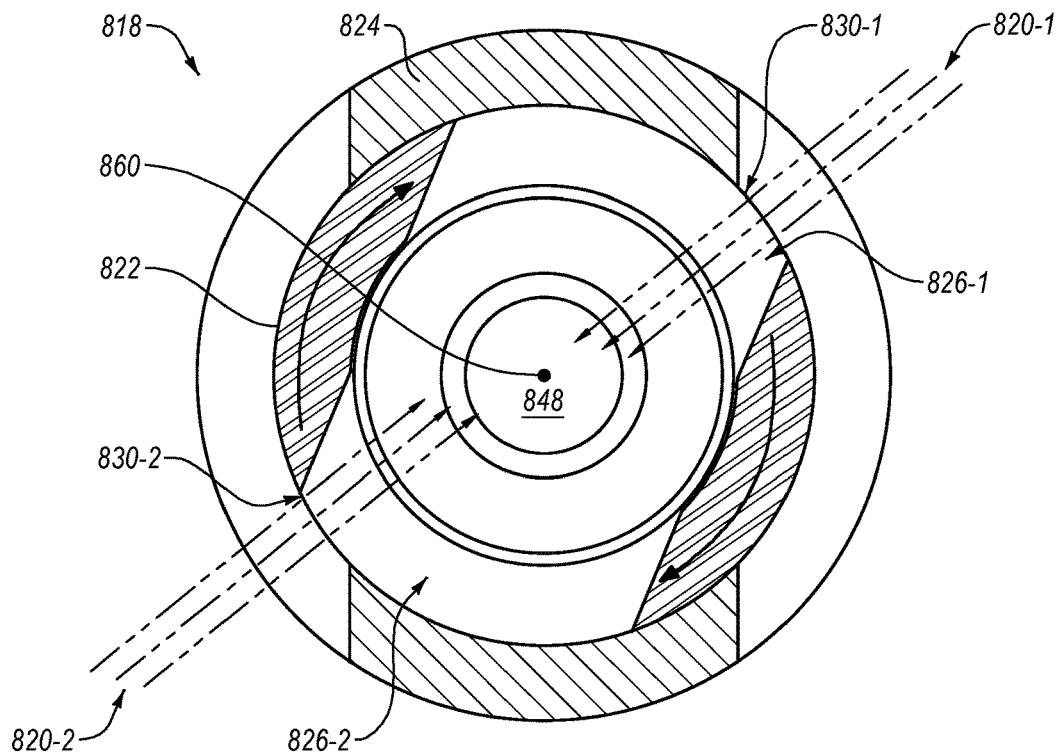

Referring now to FIG. 8-1, in a radial cross sectional view, a valve 818 may include an exterior body 824 and an interior body 822. The interior body 822 may be disposed within the exterior body 824. In some embodiments, the interior body 822 and the exterior body 824 may be coaxial around a valve rotational axis 860. In some embodiments, the interior body 822 may be rotated within the exterior body 824 about the valve rotational axis 860. The interior body 822 may include a closed and an open configuration. In some embodiments, as in the closed configuration shown in FIG. 8-1, a portion of the interior body 822 may occlude the exterior inlet 830, such as a first tab 838-1 preventing a valve fluid 820-1 from entering the chamber 848 and/or a second tab 838-2 preventing a valve fluid 820-2 from entering the chamber 848.

In some embodiments, the valve 818 may include a plurality of exterior inlets 830. For example, the valve 818 may include two exterior inlets 830. Other examples include three, four, five, six, seven, or eight exterior inlets 830. In some embodiments, the exterior inlets 830 may be radially spaced evenly around the valve rotational axis 860. In some embodiments, a pressure differential may exist between the outside of the exterior body 824 and the chamber 848. In the closed configuration, the pressure differential may cause the valve fluid 820-1, 820-2 to exert a fluid pressure on the interior body 822 at a tab 838. In some embodiments, there may be a first tab 838-1 and a second tab 838-2. In the closed configuration a first force may be applied to the interior body 822 by fluid pressure at the first tab 838-1. A second force may be applied to interior body 822 by fluid pressure at the second tab 838-2. In some embodiments, the first force and the second force may be approximately equivalent. In other embodiments, the first force and the second force may radially oppose one another. In yet other embodiments, the first force and the second force may be radially opposing and balancing, thereby creating a neutral net force on the interior body 822.

In some embodiments, when the interior body 822 is first rotated and creates a small opening, the first pressure and the second pressure may apply a force to the inside of the interior body 822, further assisting the interior body 822 in rotation from the closed configuration to the open configuration shown in FIG. 8-2.

In other embodiments, the exterior body 824 may include multiple exterior inlets 830, creating multiple forces on the interior body 822. In some embodiments, the multiple forces may be approximately equivalent and evenly radially spaced around the exterior body 824, thereby producing a neutral net force on the interior body 822.

Referring now to FIG. 8-2, the valve 818 may be rotated from the closed configuration to the open configuration. In some embodiments, as the valve rotates, at least a portion of the first exterior inlet 830-1 may align with at least a portion of the interior inlet 826-1. A valve fluid 820-1 may enter the chamber 848 through the inlet formed by the alignment of the first interior inlet 826-1 and the first exterior inlet 830-1. In some embodiments, a recess in the exterior body 824 may direct the valve fluid 820-1 through the first exterior inlet 830-1 and the first interior inlet 826-1 approximately normal to the valve rotational axis 860. In some embodiments, because of radially opposing exterior inlets 830-1 and 830-2, a first valve fluid 820-1 may enter the chamber 848 approximately simultaneously to a second valve fluid 820-2. In some embodiments, the pressure differential between outside the exterior body 824 and the chamber 848 may be approximately equivalent across a first exterior inlet 830-1 and a second exterior inlet 830-2. The first valve fluid 820-1 may contact the second valve fluid 820-2 in the chamber 848, thereby approximately cancelling each other's radial inertia and/or force. In some embodiments, the combined valve fluid 820-1, 820-2 may then be directed through the chamber 848 to the interior outlet.

Figures 1, 9:
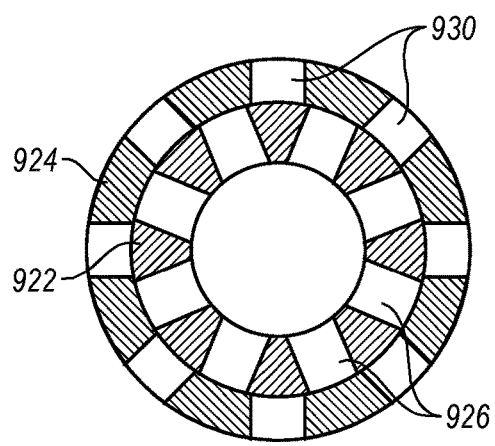
Figures 2, 9:
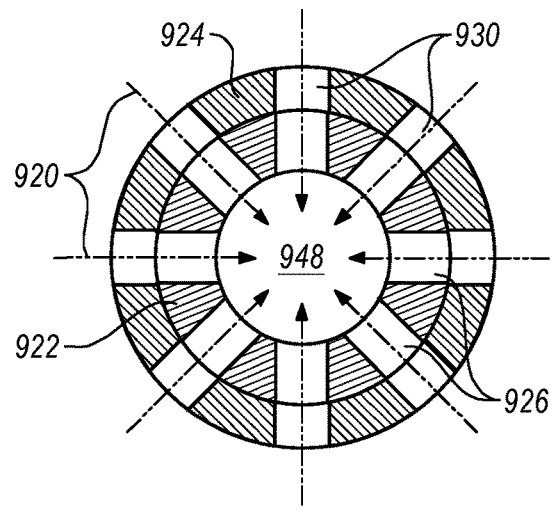

Referring to FIG. 9-1, in some embodiments in the closed configuration, the exterior body 924 may include multiple exterior inlets 930 misaligned from a plurality of interior inlets 926 in an interior body 922, creating multiple forces on the interior body 922. In some embodiments, the multiple forces may be approximately equivalent and radially spaced evenly around the exterior body 924, thereby producing a neutral net force on the interior body 922.

Referring now to FIG. 9-2, in other embodiments, in the open configuration, the exterior body 924 may include more than two exterior inlets 930, the exterior inlets 930 equally radially spaced around the exterior body 936. In some embodiments, the pressure differentials across each exterior inlet 930 are approximately equal; the valve fluid 920 may flow through a plurality of interior inlets 926 and converge in the chamber 948, cancelling approximately all (e.g., all) the different valve fluid 920 flows' radial inertia and/or force.

Figure 10:
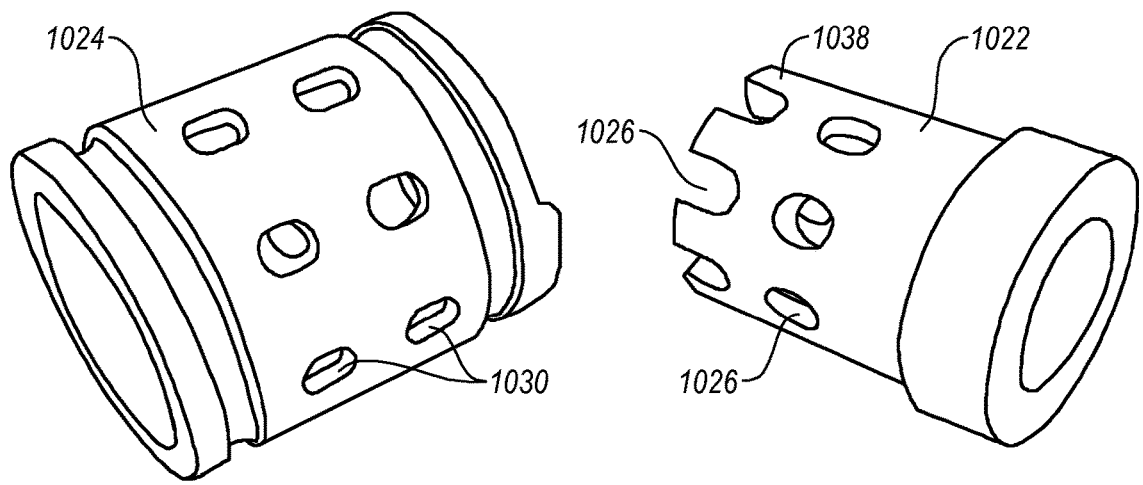
FIG. 10 is an exploded perspective view of an embodiment of a valve with a plurality of rows of inlets.

Referring now to FIG. 10, in some embodiments, an exterior body 1024 may include a plurality of rows of exterior inlets 1030, such as those described in relation to FIGS. 9-1 and 9-2. For example, the exterior body 1036 may include two rows of exterior inlets 1030. Other examples include three, four, or more rows of exterior inlets 1030. In some embodiments, an interior body 1022 may include a plurality of rows of interior inlets 1026.

In some embodiments, the rows of interior inlets 1026 may be sized and located to match the exterior inlets of the exterior body 1024. For example, the interior body 1022 may have a row of interior inlets 1026 that are enclosed by the interior body 1022 and a row of interior inlets 1026 partially defined by a plurality of tabs 1038. In other embodiments, the number of interior inlets 1026 per row and the number of interior inlet 1026 rows may differ from the number of exterior inlets 1030 per row and the number of exterior inlets 1030 rows on the exterior body 1024. For example, the interior inlet 1026 may have interior inlets 1026 spaced to selectively match up with exterior inlets 1030, thereby selectively controlling the flow of a valve fluid through some interior inlets 1026, but not others.

Figure 11:
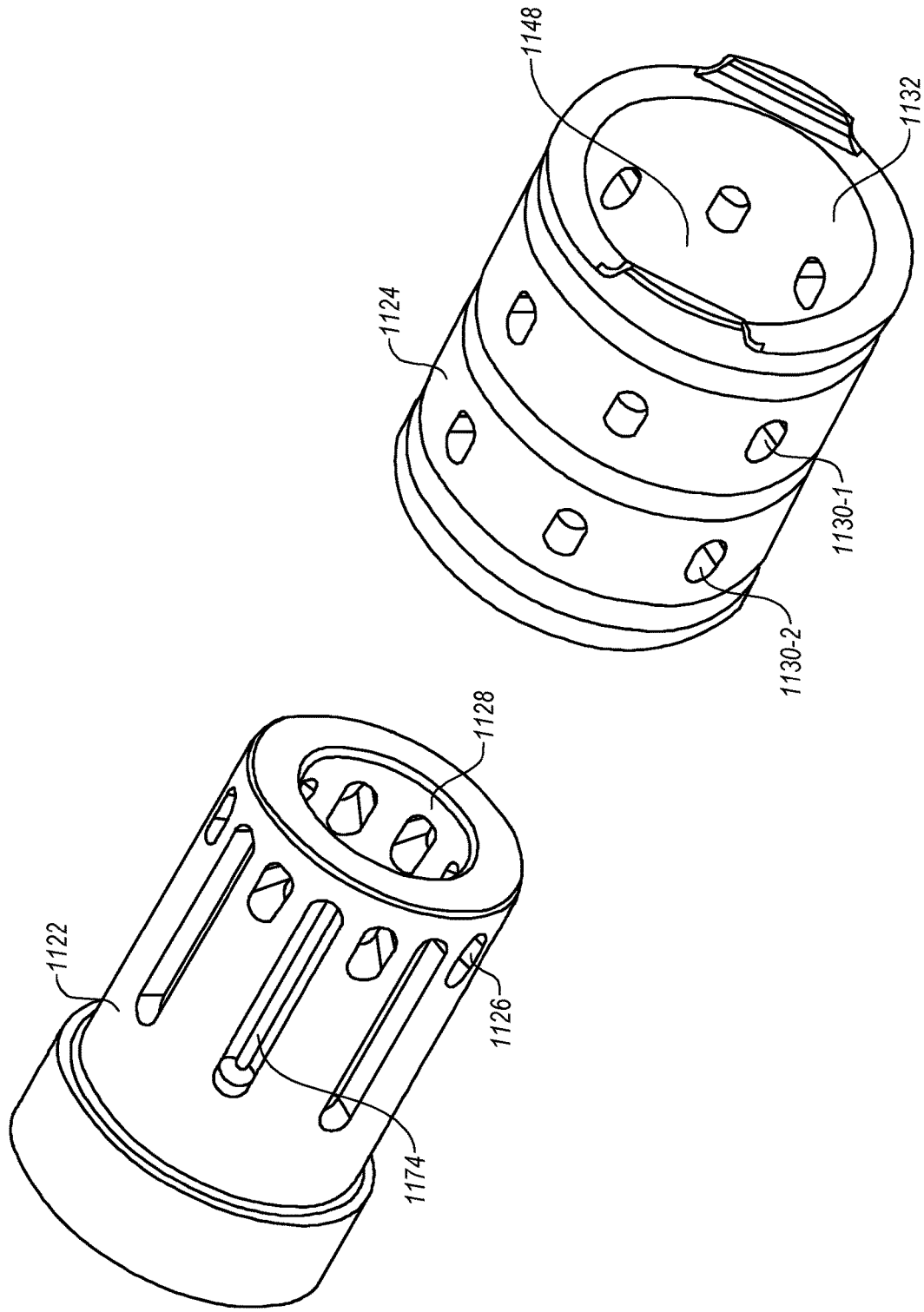
FIG. 11 is an exploded perspective view of an embodiment of a valve with axial grooves.

Referring to FIG. 11, in some embodiments, an exterior body 1124 may include a first row of exterior inlets 1130-1 and a second row of exterior inlets 1130-2, and an interior body 1122 may include a row of interior inlets 1126 and a plurality of axial grooves 1174. The interior inlets 1126 may be in fluid communication with the interior outlet 1128, and the axial grooves 1174 may not travel completely through the wall of the interior body 1122, and rather direct a fluid flow in an axial direction. In some embodiments, the axial grooves 1174 have a length of at least the longitudinal spacing between the first row of exterior inlets 1130-1 and the second row of exterior inlets 1130-2. In some embodiments, the axial grooves 1174 and the interior inlets 1126 may be spaced such that when the interior body 1122 is inserted into the chamber 1148 of the exterior body 1124, there may be a groove configuration and an open configuration.

Figures 2, 12:
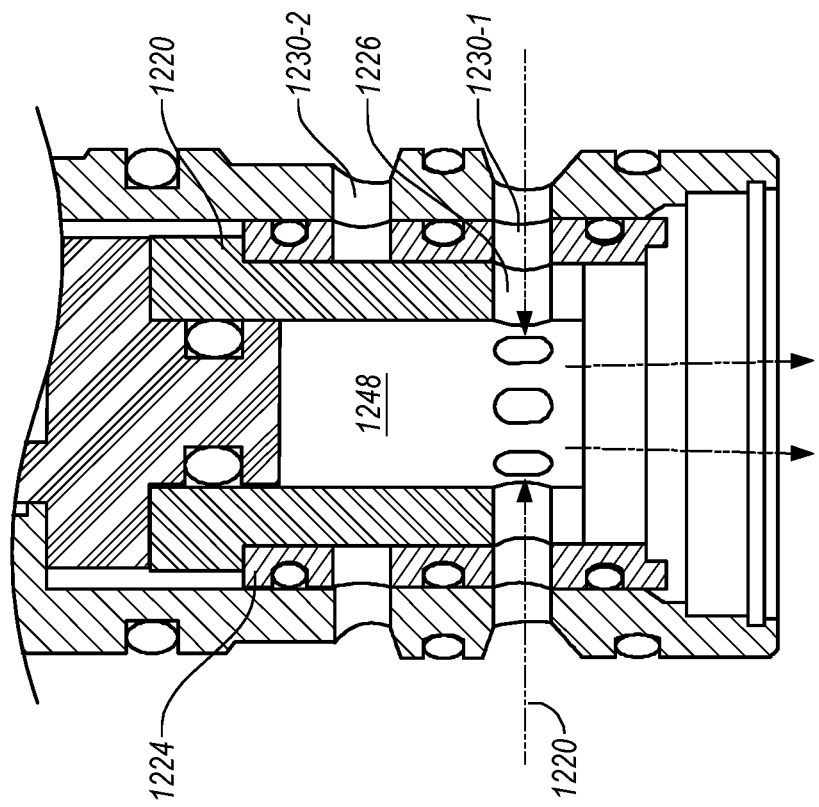
Figures 1, 12:
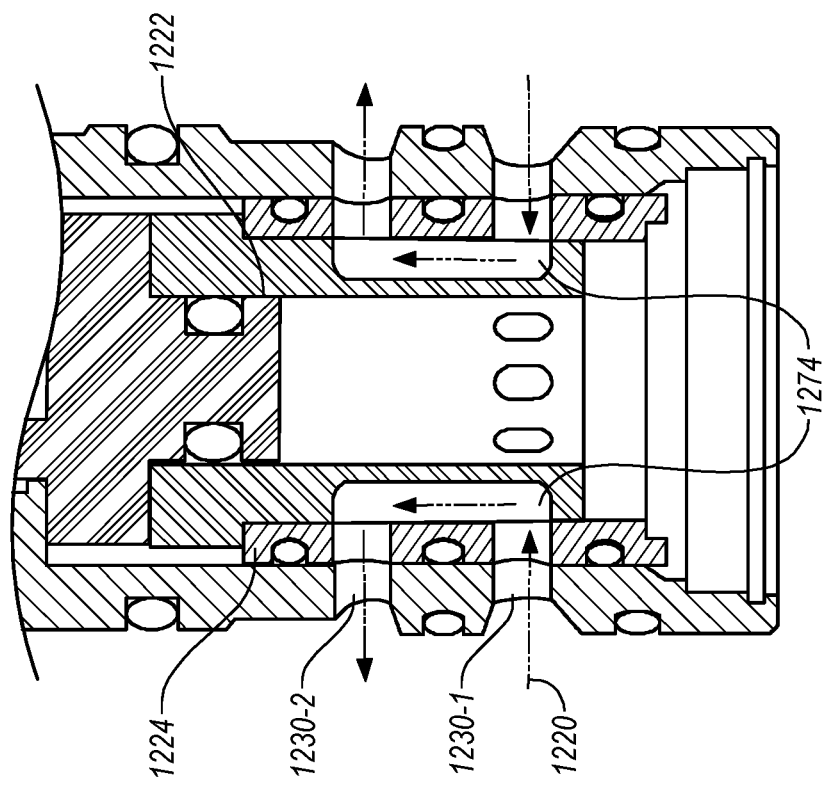

The interior body 1122 may rotate relative to the exterior body 1124 and selectively align the first row of exterior inlets 1130-1 with the interior inlets 1126 or the axial grooves 1174. Referring now to FIG. 12-1, in some embodiments, in the groove configuration, the axial grooves 1274 may be aligned with both the first row of exterior inlets 1230-1 and the second row of exterior inlets 1230-2. In some embodiments, a valve fluid 1220 may flow into the first row of exterior inlets 1230-1, through the axial grooves 1274, and out the second row of exterior inlets 1230-2. In other embodiments, a valve fluid may flow into the second row of exterior inlets 1224-2 and out the first row of exterior inlets 1224-1.

Referring now to FIG. 12-2, in some embodiments, in the open configuration, the first row of exterior inlets 1230-1 may be aligned with the row of interior inlets 1226. The second row of exterior inlets 1230-2 may be occluded by the interior body 1222. A valve fluid 1220 may flow through both the first row of exterior inlets 1230-1 and the row of interior inlets 1226 and into the chamber 1248. In other embodiments, in the open configuration, the first row of exterior inlets 1230-1 may be occluded by the interior body 1222 and the second row of exterior inlets 1230-2 may align with the row of interior inlets 1226.

In some embodiments, the interior body 1222 may include only a row of axial grooves 1274. There may be no open configuration, but a closed configuration, in which both the first row of exterior inlets 1230-1 and the second row of exterior inlets 1230-2 may be completely occluded by the interior body 1222.

Figure 13:
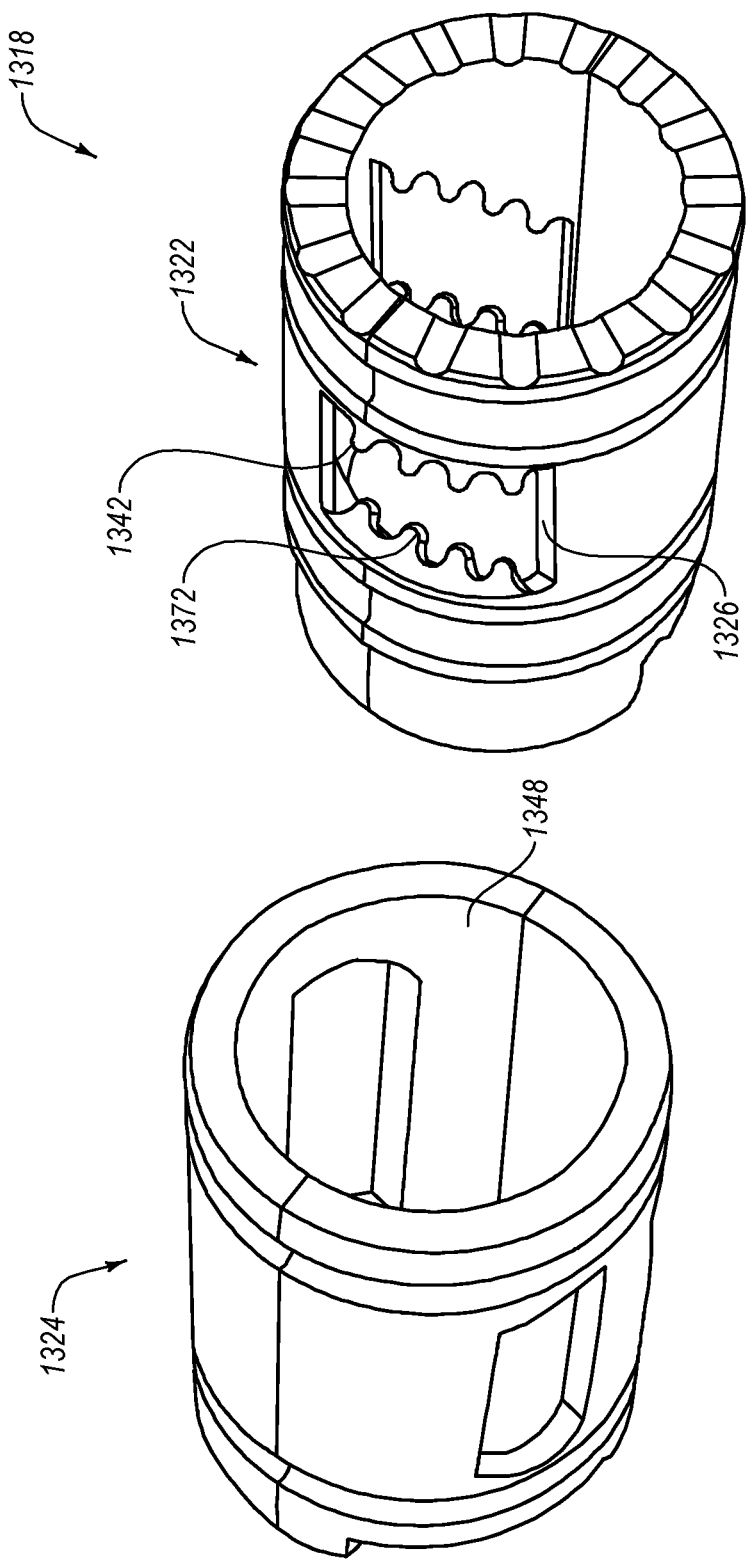
FIG. 13 is an exploded perspective view of an embodiment of a valve with a plurality of protrusions on the inlets.

Referring to FIG. 13, in some embodiments, an interior body 1322 may include an interior inlet 1326 that includes an interior inlet edge 1342 that includes at least one protrusion 1372. The at least one protrusion 1372 may be located on the longitudinally top and bottom ends of the interior inlet 1326.

Figures 2, 14:
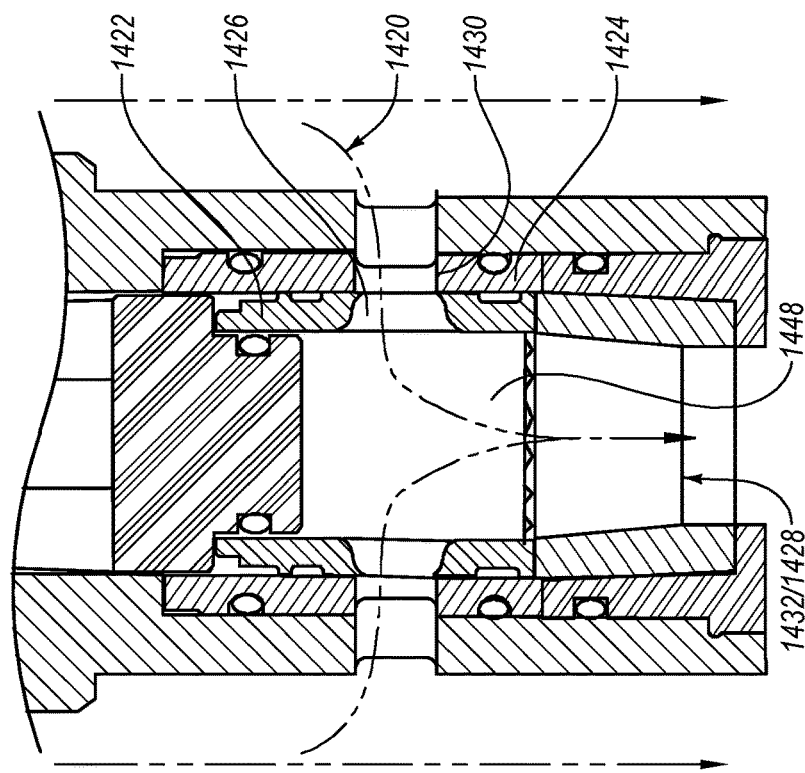
Figures 1, 14:
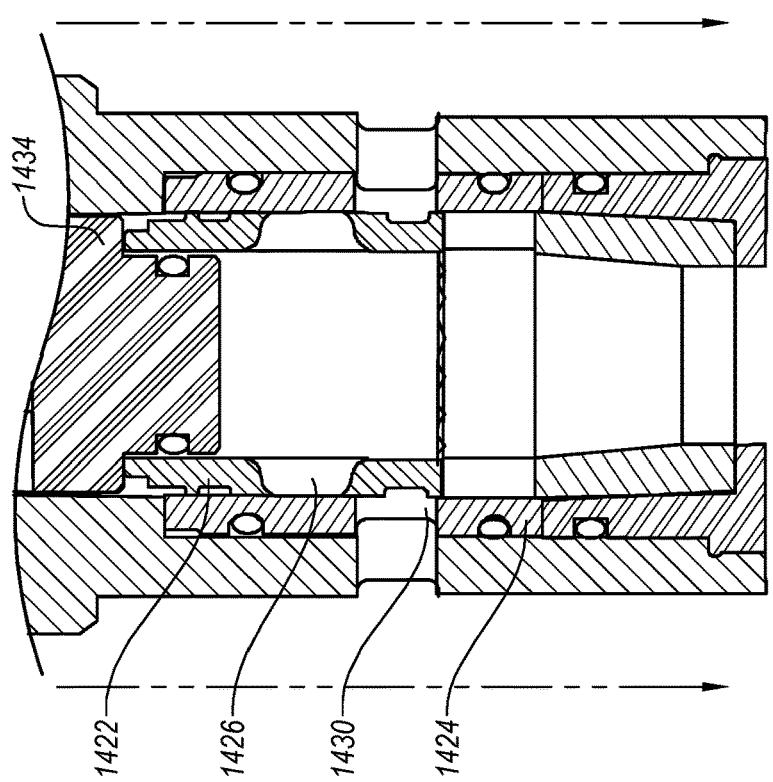

Referring now to FIG. 14-1, in some embodiments, the interior body 1422 may be longitudinally translatable within the exterior body 1424. In the closed configuration, the exterior inlet 1430 may be completely occluded by the interior body 1422. Referring now to FIG. 14-2, in some embodiments, in the open configuration, the interior inlet 1426 and the exterior inlet 1430 may be adjacently disposed. In some embodiments, a valve fluid 1420 may travel through the exterior inlet 1430 and the interior inlet 1426, into the chamber and out the exterior outlet 1432 and the interior outlet 1428.

Figure 15:
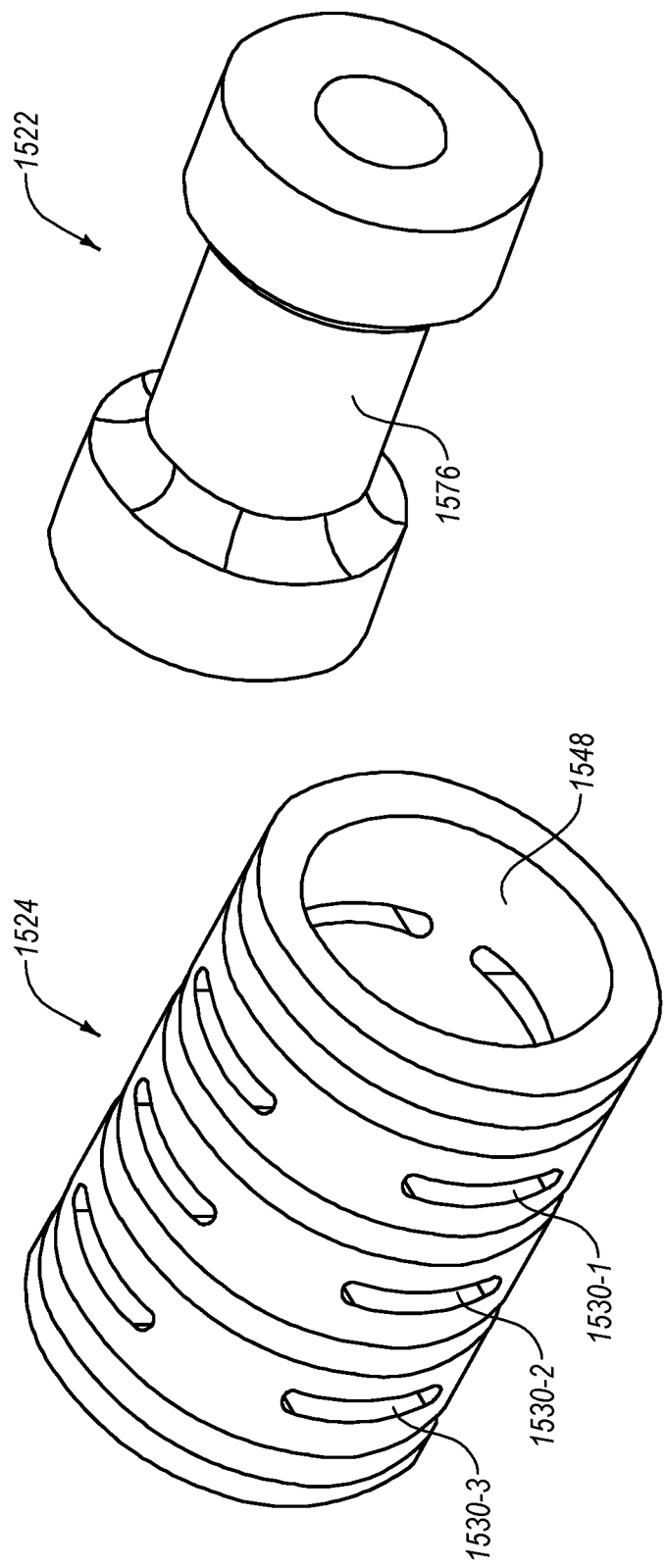
FIG. 15 is an exploded perspective view of an embodiment of a valve with a translatable interior body.

Referring to FIG. 15, in some embodiments, an interior body 1522 may redirect fluid from the exterior inlet 1530 back through the lateral wall of the exterior body 1524. For example, the exterior inlets 1530 may selectively be an inlet or outlet for a fluid. In some embodiments, the interior body 1522 may include an interior neck 1576 that returns at least a portion of a received fluid from the exterior body 1524 back toward the exterior body 1524. For example, the interior neck 1576 includes a reduction in an outer diameter of the interior body 1522 and has no interior inlet or outlet.

In some embodiments, an exterior body 1524 may include a first row of exterior inlets 1530-1, a second row of exterior inlets 1530-2, and a third row of exterior inlets 1530-3. The interior body 1522 may be inserted into a chamber 1548 of the exterior body 1524 and the interior neck 1576 may be positioned radially inward from one or more of the exterior inlets 1530-1, 1530-2, 1530-3. In some embodiments, the length of the interior neck 1576 may have a length less than the length between the first row of exterior inlets 1530-1 and the third row of exterior inlets 1530-3.

The exterior inlets 1530-1, 1530-2, 1530-3 may be in fluid communication with various combinations of one another depending at least partially upon the longitudinal location of the interior body 1522 relative to the exterior body 1524. For example, FIGS. 16-1 and 16-2 illustrate an embodiment of an interior body 1622 moving longitudinally relative to an exterior body 1624.

Figures 2, 16:
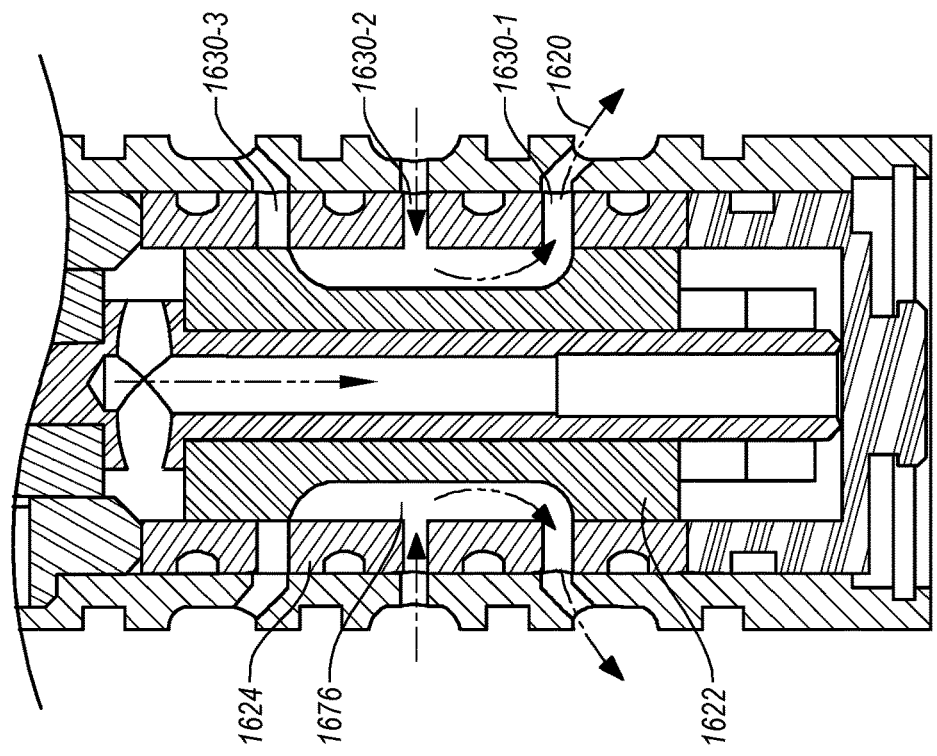
Figures 1, 16:
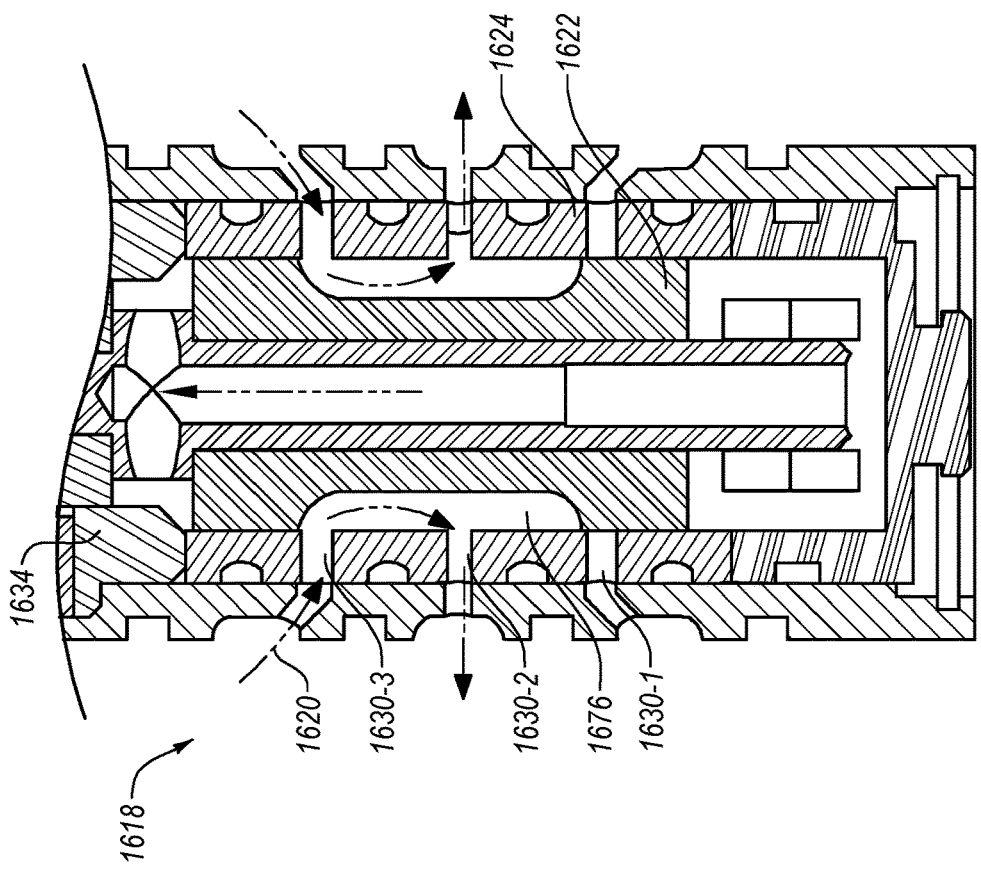

Referring now to FIG. 16-1, in some embodiments, the interior body 1622 may be longitudinally translatable between a first configuration and a second configuration by a valve actuator 1634. In some embodiments, in the first configuration, the interior neck 1676 may occlude the first row of exterior inlets 1630-1, and place the second row of exterior inlets 1630-2 and the third row of exterior inlets 1630-3 in fluid communication with one another. In some embodiments, a valve fluid 1620 may enter the third row of exterior inlets 1630-3, travel adjacent the interior neck 1676, and out the second row of exterior inlets 1630-2. In other embodiments, the fluid 1620 may enter the second row of exterior inlets 1630-2, travel adjacent the interior neck 1676, and out the third row of exterior inlets 1630-3. In still other embodiments, the valve fluid 1620 may enter into a first exterior inlet of a row of exterior inlets, and out a second exterior inlet in the same row of exterior inlets 1630-1, 1630-2, 1630-3 (e.g., the first row of exterior inlets 1630-1 may be in fluid communication with one another). In yet other embodiments, the valve fluid 1620 may enter a first exterior inlet in of a row of exterior inlets, and out a second exterior inlet in a different row of exterior inlets.

Referring now to FIG. 16-2, in the second configuration, the interior neck 1676 may occlude the third row of exterior inlets 1630-3, and extend from the first row of exterior inlets 1630-1 to the second row of exterior inlets 1630-2. In some embodiments, a valve fluid 1620 may enter the first row of exterior inlets 1630-1, travel adjacent the interior neck 1676, and out the second row of exterior inlets 1630-2. In other embodiments, the valve fluid 1620 may enter the second row of exterior inlets 1630-2, travel through the interior neck 1676, and out the first row of exterior inlets 1630-1.

Figure 17:
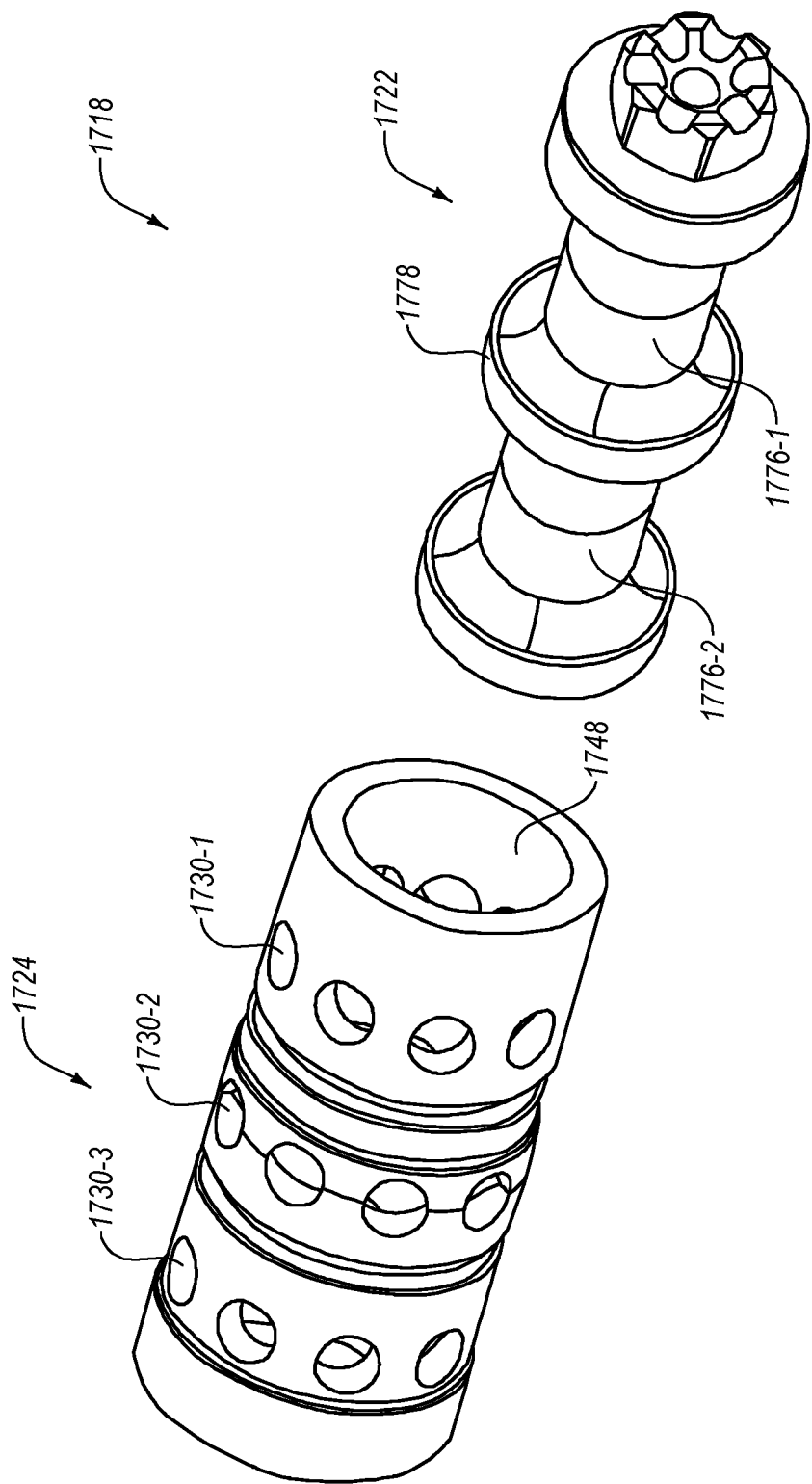
FIG. 17 is an exploded perspective view of an embodiment of a valve with a translatable interior body with a plurality of interior necks.

Referring to FIG. 17, in some embodiments, a valve 1718 may include an exterior body 1724 and an interior body 1722 with a first neck 1776-1 and a second neck 1776-2 located longitudinally displaced from one another. A ridge 1778 may longitudinally separate the first neck 1776-1 and the second neck 1776-2. An exterior body 1724 may include a first row of exterior inlets 1730-1, a second row of exterior inlets 1730-2, and a third row of exterior inlets 1730-3. The interior body 1722 may be inserted into the chamber 1748. In some embodiments, the length of the first neck 1776-1 and the length of the second neck 1776-2 may each have a longitudinal length less than the length between the first row of exterior inlets 1730-1 and the second row of exterior inlets 1730-2 and/or the length between the second row of exterior inlets 1730-2 and the third row of exterior inlets 1730-3.

Figures 2, 18:
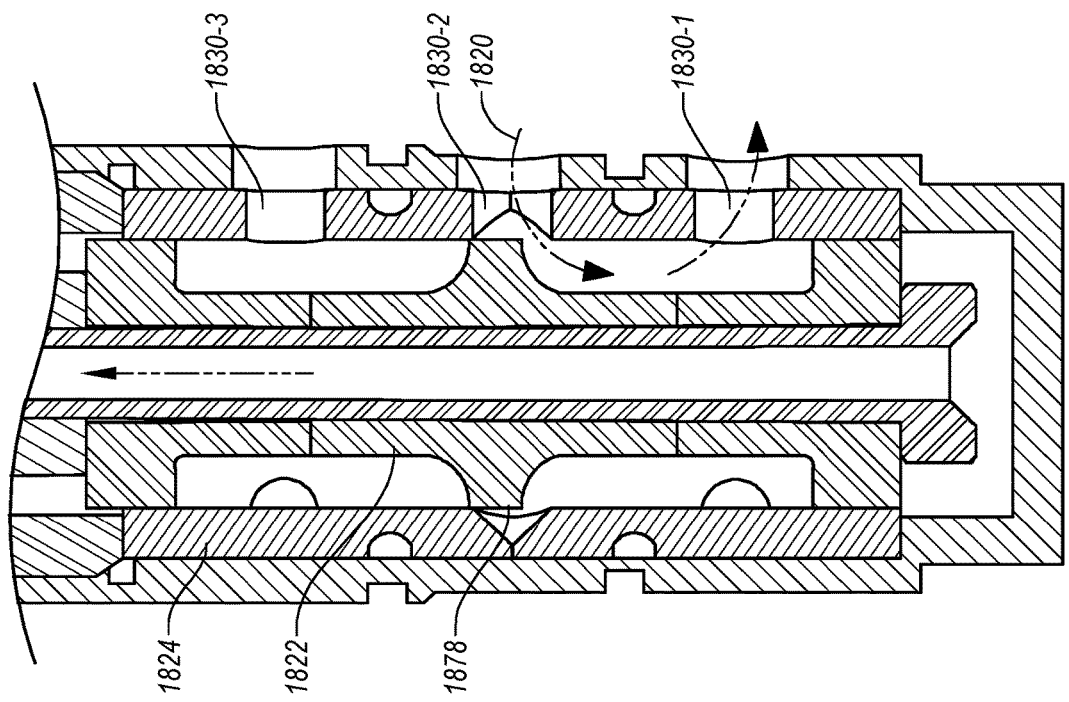
Figures 1, 18:
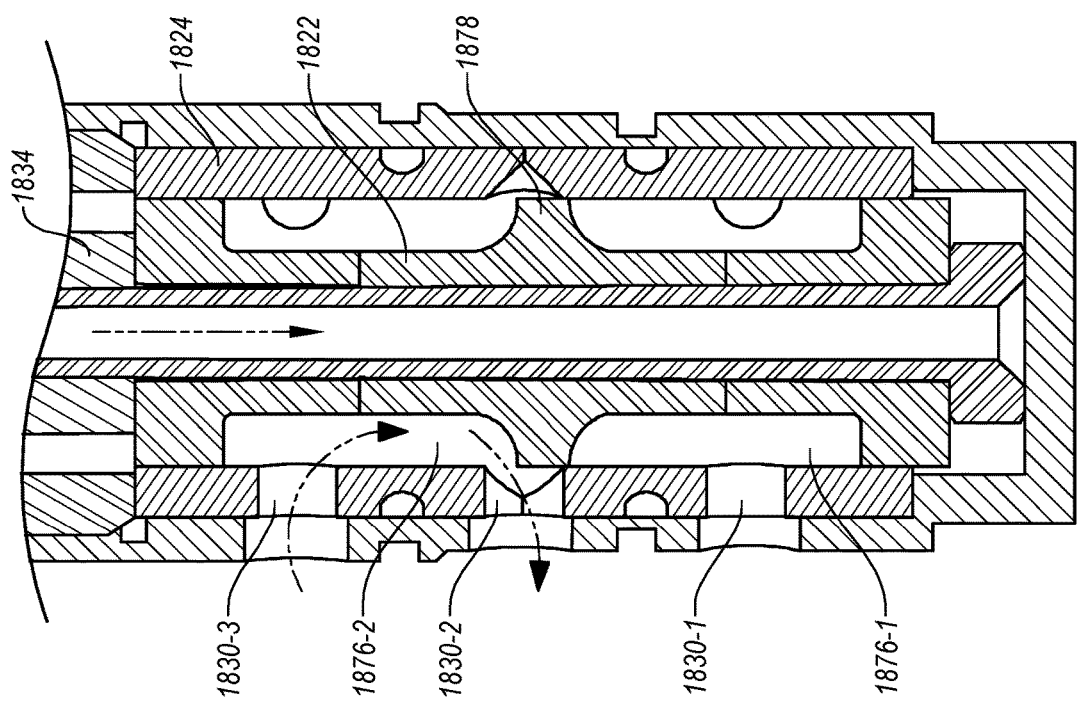

Referring now to FIG. 18-1, in some embodiments, an interior body 1822 may be longitudinally translatable relative to an exterior body 1824 between a first configuration and a second configuration by a valve actuator 1834. In the first configuration, a ridge 1870 may be located at least partially between the second row of exterior inlets 1830-2 and the first row of exterior inlets 1830-1. In some embodiments, a valve fluid 1820 may enter the second neck 1876-2 through the third row of exterior inlets 1830-3 and flow out the second row of exterior inlets 1830-2. In other embodiments, the valve fluid 1820 may enter the second neck 1876-2 through the second row of exterior inlets 1830-2 and flow out the third row of exterior inlets 1830-3. In some embodiments, the valve fluid 1850 may be blocked from entering the first neck 1868-1 by the ridge 1870 contacting the exterior body 1836.

Referring now to FIG. 18-2, in the second configuration, the ridge 1870 may be located at least partially between the second row of exterior inlets 1824-2 and the third row of exterior inlets 1824-3. In some embodiments, the valve fluid 1850 may enter the first neck 1868-1 through the first row of exterior inlets 1824-1 and flow out the second row of exterior inlets 1824-2. In other embodiments, the valve fluid 1850 may enter the first neck 1868-1 through the second row of exterior inlets 1824-2 and flow out the first row of exterior inlets 1868-1. In some embodiments, the valve fluid 1850 may be blocked from entering the second neck 1868-2 by the ridge 1870 contacting the exterior body 1836.

Figure 19:
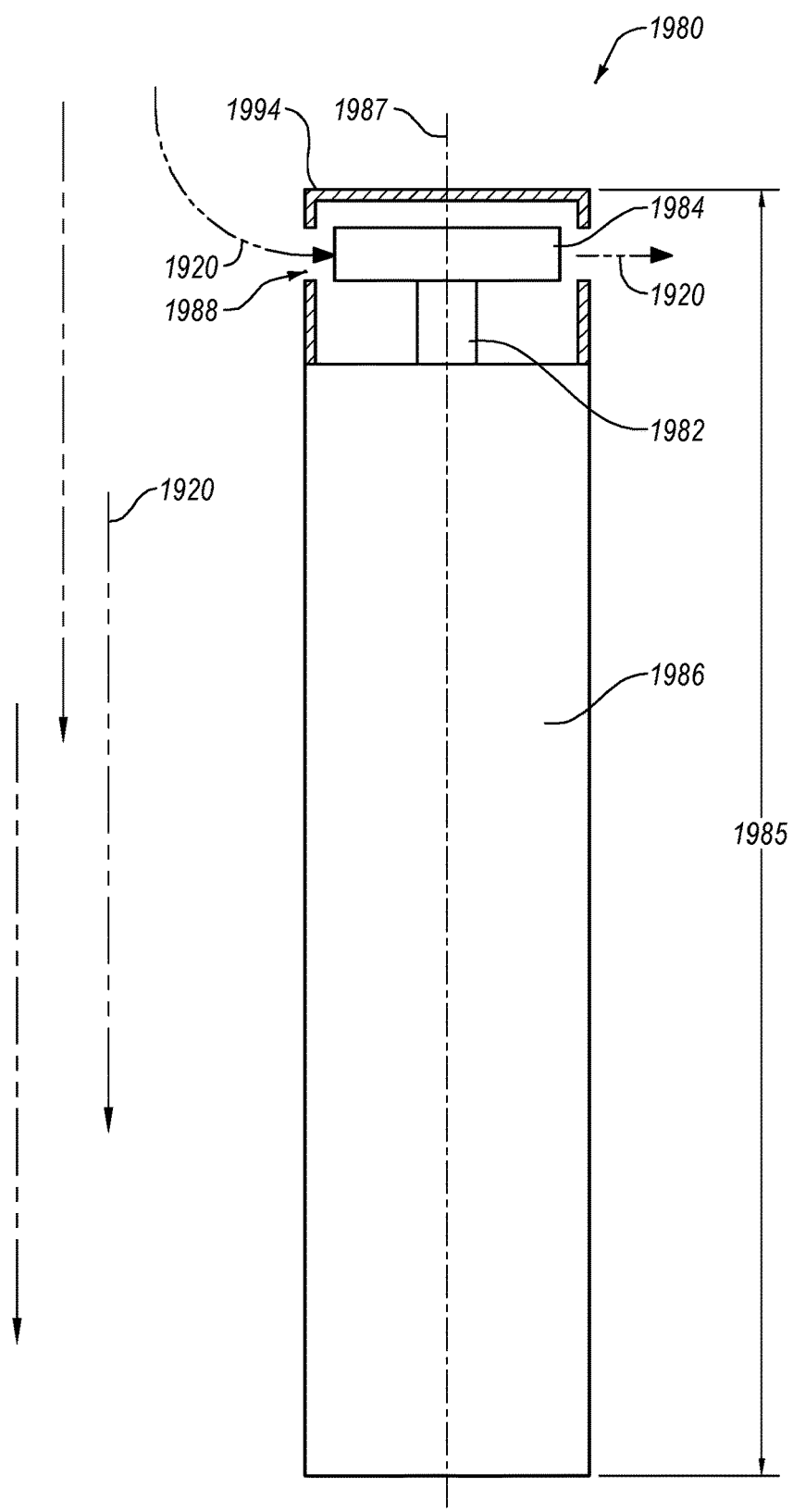
FIG. 19 is a schematic side partial cutaway view of an embodiment of a turbine.

In some embodiments of a downhole tool, a valve according to the present description (e.g., any embodiment of a valve depicted to described in relation to FIG. 2 through FIG. 18-2) may be actuated by a valve actuator powered by a downhole turbine. FIG. 19 illustrates an embodiment of a turbine 1980 that may be used in a downhole environment to generate electricity.

FIG. 19 is a side view of an embodiment of a turbine 1980 having a rotor 1982 and a wheel 1984. In some embodiments, the turbine 1980 may have a generator 1986 configured to generate electricity as the rotor 1982 rotates relative to the generator 1986. The wheel 1984 may move in response to a fluid pressure from a fluid 1920 and apply a torque to the rotor 1982. In some embodiments, the fluid 1920 may be a drilling fluid, such as the drilling fluid 116 described in relation to FIG. 1, that is pumped through the drill string and a portion of the drilling fluid may be directed into the turbine 1980. In other embodiments, the fluid 1920 may be a hydraulic fluid used to actuate one or more devices in a downhole environment. For example, the fluid 1920 may be a hydraulic fluid that is used to pressurize one of more chambers to actuate a steering pad in a steerable tool.

In some embodiments, the fluid pressure from the fluid 1920 may rotate the wheel 1984, which subsequently rotates the rotor 1982 relative to the generator 1986 about a rotational axis 1987. For example, the generator 1986 may be held rotationally stationary relative to the fluid 1920 flow and may act as the stator of a direct current generator. In some embodiments, the turbine 1980 may include a housing 1994 that at least partially encloses the wheel 1984. For example, the housing 1994 may have a transverse width greater than the wheel 1984 and a longitudinal length greater than the wheel 1984. The housing 1994 may have one or more openings therein to allow the fluid 1920 to enter and/or exit the housing 1994.

In some embodiments, the fluid 1920 may enter an inlet 1988 into the housing 1994 and interact with the wheel 1984. In some embodiments, the inlet 1988 may be positioned in a radial and/or transverse wall of the housing 1994. In other embodiments, the inlet 1988 may be positioned in a longitudinal end of the housing 1994. The fluid 1920 may exit the housing in a variety of locations. For example, the fluid 1920 is shown exiting the housing 1994 radially opposite the inlet 1988. In other embodiments, the fluid 1920 may exit the housing 1994 through the radial wall of the housing at an angle (in the direction of rotation of the wheel 1984 about the rotational axis 1987) relative to the inlet 1988 in a range having an upper value, a lower value, or upper and lower values including any of 45°, 60°, 75°, 90°, 105°, 120°, 135°, 150°, 165°, 180°, 195°, 210°, 225°, 240°, 255°, 270°, 285°, 300°, 315°, or any values therebetween. For example, the fluid 1920 may exit the housing 1994 through the radial wall of the housing 1994 at an angle greater than 45°. In other examples, the fluid 1920 may exit the housing 1994 through the radial wall of the housing 1994 at an angle less than 315°. In yet other examples, the fluid 1920 may exit the housing 1994 through the radial wall of the housing 1994 at an angle in a range of 45° to 315°. In further other examples, the fluid 1920 may exit the housing 1994 through the radial wall of the housing 1994 at an angle in a range of 90° to 270°.

In yet other embodiments, the fluid 1920 may exit the housing 1994 at least partially in a longitudinal direction (i.e., in the direction parallel to the rotational axis 1987). For example, the fluid 1920 may enter the housing 1994 through an inlet 1988 in the radial wall and spiral around the rotational axis 1987 while moving in the longitudinal direction.

As some embodiments of the turbine 1980 described herein may be used in downhole applications in which space is limited, in some embodiments, the turbine 1980 may have a longitudinal length 1985 in a range having an upper value or upper and lower values including any of 5 centimeters (cm), 6 cm, 7 cm, 8 cm, 9 cm, 10 cm, 11 cm, 12 cm, 13 cm, 14 cm, 15 cm, 16 cm, 17 cm, 18 cm, 19 cm, 20 cm, or any values therebetween. For example, the turbine 1980 may have a longitudinal length 1985 less than 20 cm. In other examples, the turbine 1980 may have a longitudinal length 1985 in a range of 5 cm to 20 cm. In yet other examples, the turbine 1980 may have a longitudinal length 1985 less than 15 cm.

FIG. 20-1 through 20-5 illustrate different embodiments of wheels that may rotate the rotor, such as rotor 1982 described in relation to FIG. 19. FIG. 20-1 is a transverse cross-sectional view of an embodiment of a wheel 1984 having a wheel body 1990 and a plurality of blades 1989 connected thereto. The blades 1989 may project radially from the wheel body 1990. In some embodiments, the blades 1989 and the wheel body 1990 may include different materials. For example, the fluid used to rotate the wheel 1984 may have suspended solids therein, as described above. The solids may be abrasive and/or cause erosion in a turbine. At least a portion of the wheel 1984 and/or rotor 1982 of the turbine may include an ultrahard material to withstand the extended use in and/or exposure to a fluid with suspended solids therein.

As used herein, the term "ultrahard" is understood to refer to those materials known in the art to have a grain hardness of about 1,500 HV (Vickers hardness in kg/mm$^2$) or greater. Such ultrahard materials can include but are not limited to diamond, sapphire, moissantite, hexagonal diamond (Lonsdaleite), cubic boron nitride (cBN), polycrystalline cBN (PcBN), Q-carbon, binderless PcBN, diamond-like carbon, boron suboxide, aluminum manganese boride, metal borides, boron carbon nitride, PCD (including, e.g., leached metal catalyst PCD, non-metal catalyst PCD, and binderless PCD or nanopolycrystalline diamond (NPD)) and other materials in the boron-nitrogen-carbon-oxygen system which have shown hardness values above 1,500 HV, as well as combinations of the above materials. In some embodiments, the ultrahard material may have a hardness values above 3,000 HV. In other embodiments, the ultrahard material may have a hardness value above 4,000 HV. In yet other embodiments, the ultrahard material may have a hardness value greater than 80 HRa (Rockwell hardness A).

In some embodiments, one or more blades 1989 of a wheel 1984 may include PCD or other ultrahard material. In other embodiments, at least a portion of the wheel body 1990 may include PCD or other ultrahard material. In yet other embodiments, at least a portion of the rotor 1982 may include PCD or other ultrahard material. The wheel 1984 may have any number of blades 1989. In some embodiments, the wheel 1984 may have 1, 2, 3, 4, 5, 6, 7, 8, or more blades 1989. In some embodiments, the blades 1989 may be angularly spaced about the wheel 1984 at equal angular intervals. In other embodiments, the blades 1989 may be angularly spaced about the wheel 1984 as unequal angular intervals.

FIG. 20-2 illustrates another embodiment of a wheel 2084 according to the present disclosure. In some embodiments, a wheel 2084 may have no wheel body and may have one or more blades 2089 connected directly to the rotor 2082. In some embodiments, one or more blades 2089 of a wheel 2084 may include PCD or other ultrahard material.

FIG. 20-3 illustrates yet another embodiment of a wheel 2184 configured to rotate a rotor 2182. In some embodiments, the wheel 2184 may include or be a spiral blade 2189 that spirals around the outer surface of the rotor 2182. The spiral blade 2189 may rotate as a fluid moves in the longitudinal direction past the rotor 2182. In some embodiments, a spiral blade 2189 may include PCD or other ultrahard material.

FIG. 20-4 illustrates a further embodiment of a wheel 2284 configured to rotate a rotor 2282. As described herein, the wheel 2284 may be exposed to an erosive environment as the fluid may have suspended solids therein. One or more portions of the wheel 2284 may include PCD liners or inserts 2292 to increase the operational lifetime of the wheel 2284. For example, the wheel 2284 of FIG. 20-4 has a wheel body 2290 and a plurality of blades 2289 protruding radially from the wheel body 2290. During use of the turbine, the highest wear rate on the wheel 2284 may be the face of the blades 2289. An insert 2292 including PCD or other ultrahard material may be positioned on a face of one or more of the blades 2289 to increase the wear-resistance of the blades 2289. In some embodiments, the insert 2292 may be a replaceable insert, allowing the blades 2289 to be repaired and the turbine refurbished.

FIG. 20-5 illustrates a yet further embodiment of a wheel 2384, according to the present disclosure. In some embodiments, the wheel 2384 may have a wheel body 2390 and one or more blades 2389 that are integrally formed with one another. For example, the blades 2389 and wheel body 2390 may be a monolithic piece of ultrahard material, such a single continuous PCD compact. The wheel 2384 may have an aperture formed therein to receive the rotor 2382 during assembly of the turbine.

Figure 21:
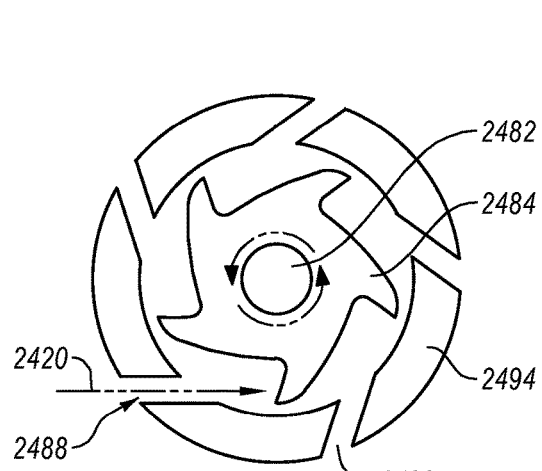
FIG. 21 is a schematic view of an embodiment of a wheel and housing.

FIG. 21 illustrates a longitudinal view (e.g. a top view) of yet another embodiment of a wheel 2484 in a housing 2494. The wheel 2484 may rotate relative to the housing 2494 and rotate the connected rotor 2482. The rotation of the wheel 2484 may be driven at least partially by the flow of the fluid 2420 within the housing 2494.

In some embodiments, the housing 2494 may have a plurality of inlets 2488. For example, the housing 2494 may have 2, 3, 4, 5, 6, 7, 8, 9, 10, or more inlets 2488. In some embodiments, the housing 2494 may have a quantity of inlets 2488 equal to the quantity of blades on the wheel 2484. In other embodiments, the housing 2494 may have a quantity of inlets 2488 less than the quantity of blades on the wheel 2484. In yet other embodiments, the housing 2494 may have a quantity of inlets 2488 greater than the quantity of blades on the wheel 2484.

The fluid 2420 may be erosive to the housing 2494, as well as the wheel 2484. In some embodiments, the housing 2494 may include an ultrahard material, such as PCD. For example, the housing 2494 may be formed of a monolithic PCD. In other examples, the housing 2494 may be formed of a plurality of PCD components joined together. In yet other examples, the housing 2494 may have an ultrahard material, such as PCD, positioned on an inner surface of the housing 2494 (e.g., facing and/or adjacent to the wheel 2484) to increase the wear-resistance and/or operational lifetime of the housing 2494 as the fluid 2420 circulates within the housing 2494.

Figure 22:
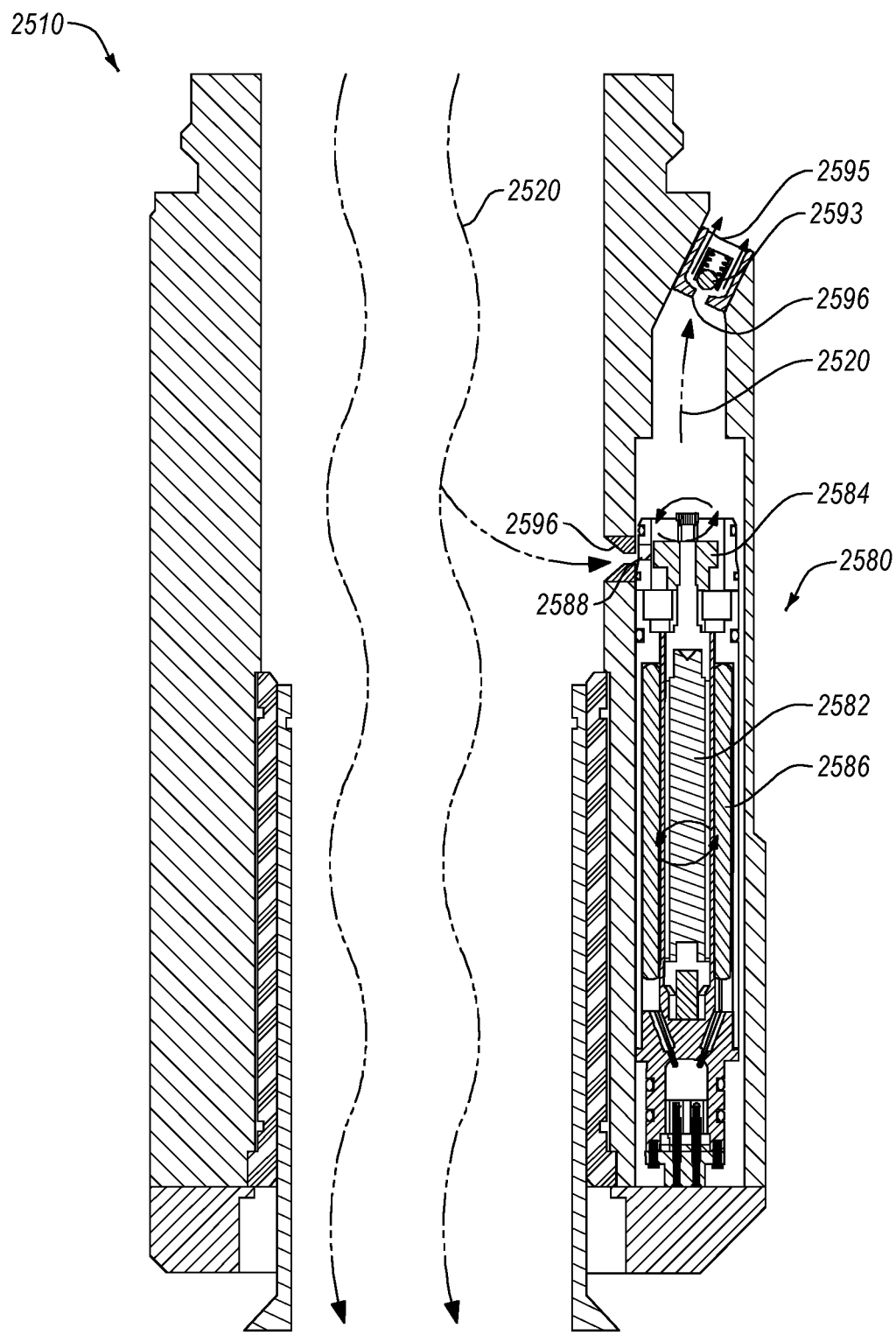
FIG. 22 is a longitudinal cross-sectional view of an embodiment of a downhole tool with a turbine in a wall thereof.

FIG. 22 is a longitudinal cross-sectional view of a downhole tool 2510 with a turbine 2580 according to the present disclosure. The turbine 2580 may receive a drilling fluid 2520 or other fluid through an inlet 2588 to the wheel 2584. The fluid pressure and/or flow rate of the fluid 2520 may be at least partially controlled by uphole operations. The fluid pressure and/or flow rate of the fluid 2520 at the turbine 2580 may also be at least partially controlled by the dimensions of the inlet 2588 and an outlet 2595. In some embodiments, a nozzle 2596 may be positioned in or adjacent to the inlet 2588 and/or outlet 2595 to adjust the differential pressure and/or flow rate of the fluid 2520 through the turbine 2580. In some embodiments, one or more of the nozzles 2596 may include an ultrahard material, such as PCD, and/or may be replaceable to allow repair of the turbine 2580 and/or downhole tool 2510. For example, the nozzle 2596 may adjust the differential pressure by constricting fluid flow through the nozzle 2596. Constricting the fluid 2520 may increase the erosive energy of the fluid 2520 and subject the nozzle 2596 to high erosive rates. Embodiments of a nozzle 2596 including an ultrahard material may have a longer operational lifetime than conventional nozzles.

In some embodiments, the nozzle 2596 have an opening dimension (e.g. diameter of the opening through the nozzle 2596) in a range having an upper value, a lower value, or upper and lower values including any of 1.0 mm, 1.2 mm, 1.4 mm, 1.6 mm, 1.8 mm, 2.0 mm, 2.2 mm, 2.4 mm, 2.6 mm, 2.8 mm, 3.0 mm, or any values therebetween. For example, the nozzle 2596 may have an opening dimension greater than 1.0 mm. In other examples, the nozzle 2596 may have an opening dimension less than 3.0 mm. In yet other examples, the nozzle 2596 may have an opening dimension in a range of 1.0 mm to 3.0 mm. In further examples, the nozzle 2596 may have an opening dimension in a range of 2.0 mm to 3.0 mm. In yet further examples, the nozzle 2596 may have an opening dimension in a range of 1.2 mm to 2.8 mm. In still further examples, the nozzle 2596 may have an opening dimension in a range of 1.5 mm to 2.5 mm.

A wear-resistant nozzle 2596 may allow a more consistent pressure differential across the turbine for a longer operational lifetime. A more consistent pressure differential may provide a more consistent rotational rate of the wheel 2584 and rotor 2582. A more consistent rotational rate of the rotor 2582 may provide a more consistent power generation by the generator 2586.

In some embodiments, the turbine 2580 may be selectively controlled by a check valve or other flow control 2593 at the inlet 2588 and/or outlet 2595 of the fluid 2520. By closing the flow control 2593 at the inlet 2588 and/or outlet 2595, the flow and/or pressure differential of the fluid 2520 may be set to zero, turning off the turbine 2580.

Figure 23:
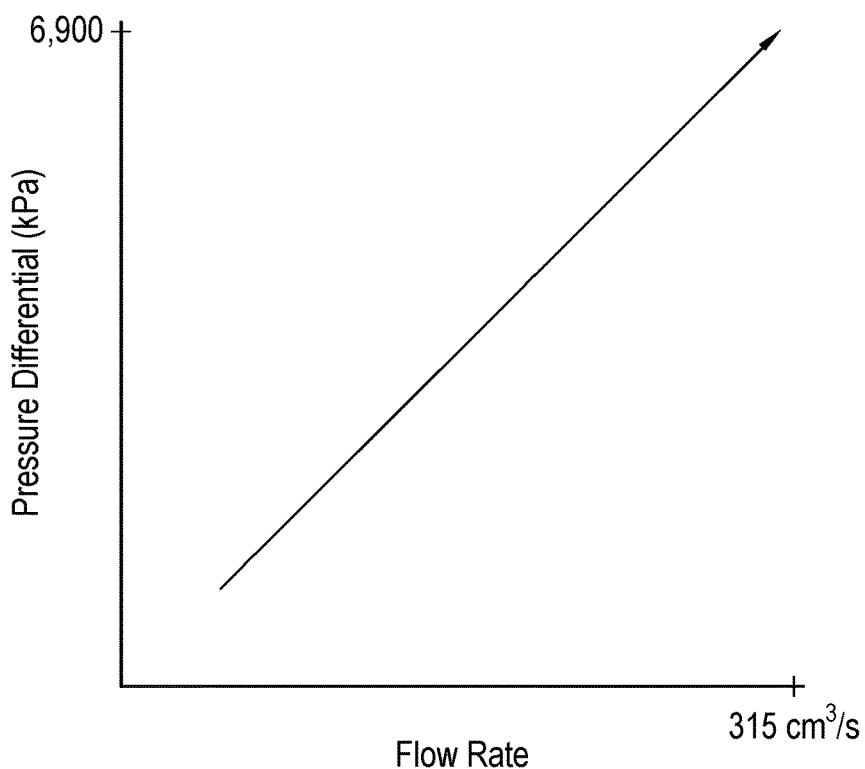
FIG. 23 is a chart illustrating a linear relationship between the pressure differential and the flow rate through an embodiment of a turbine.

In some embodiments, the flow rate of the fluid 2520 through the turbine 2580 may have a substantially linear relationship with the pressure differential across the turbine 2580 from the inlet 2588 to the outlet 2595. FIG. 23 illustrates the linear relationship between the flow rate and the pressure differential. In some embodiments, the relationship may be substantially linear up to a flow rate of approximately 315 cubic centimeters per second (cm³/s). In other embodiments, the relationship may be substantially linear up to a pressure differential of approximately 6900 kilopascals (kPa), while in some embodiments, the relationship may be substantially linear up to a pressure differential of approximately 11000 kPa.

Figure 24:
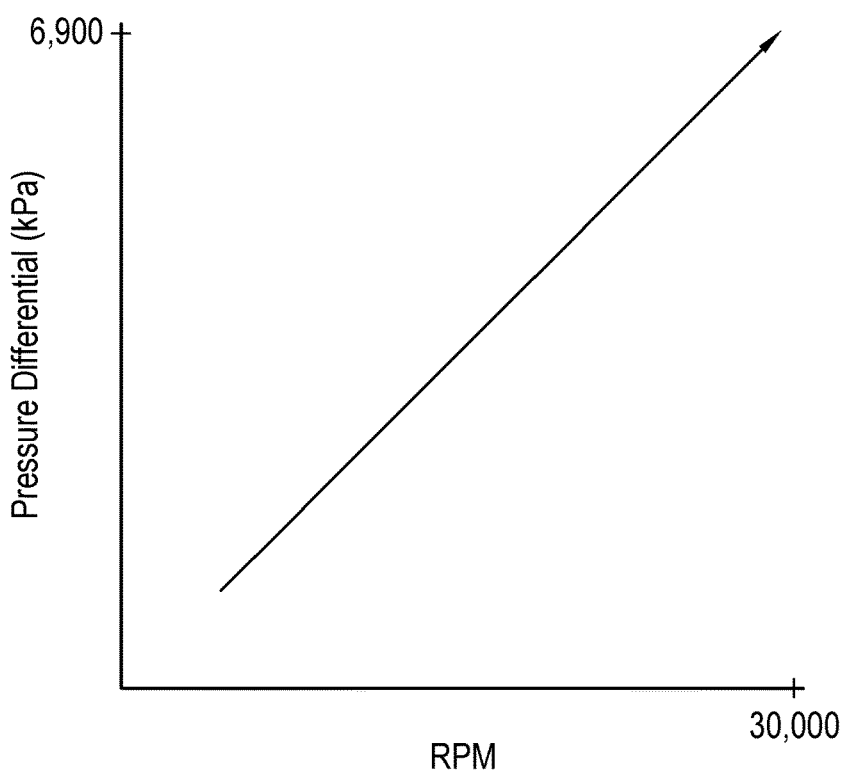
FIG. 24 is a chart illustrating a linear relationship between the pressure differential and the rotational rate of an embodiment of a turbine.

In some embodiments, a rotational rate of the wheel may be at least partially dependent on the fluid pressure differential across the turbine (such as wheel 2584 of turbine 2580 of FIG. 22). In other embodiments, the rotational rate of the wheel may have a linear relationship with the pressure differential. For example, FIG. 24 illustrates a linear relationship between a rotational rate of an embodiment of a turbine and a pressure differential across the turbine. In some embodiments, a turbine may have a linear relationship between the rotational rate and the fluid pressure differential up to a rotational rate of 30,000 revolutions per minute (RPM). In other embodiments, a turbine may have a linear relationship between the rotational rate and the fluid pressure differential up to a pressure differential of approximately 6900 kilopascals (kPa).

Figure 25:
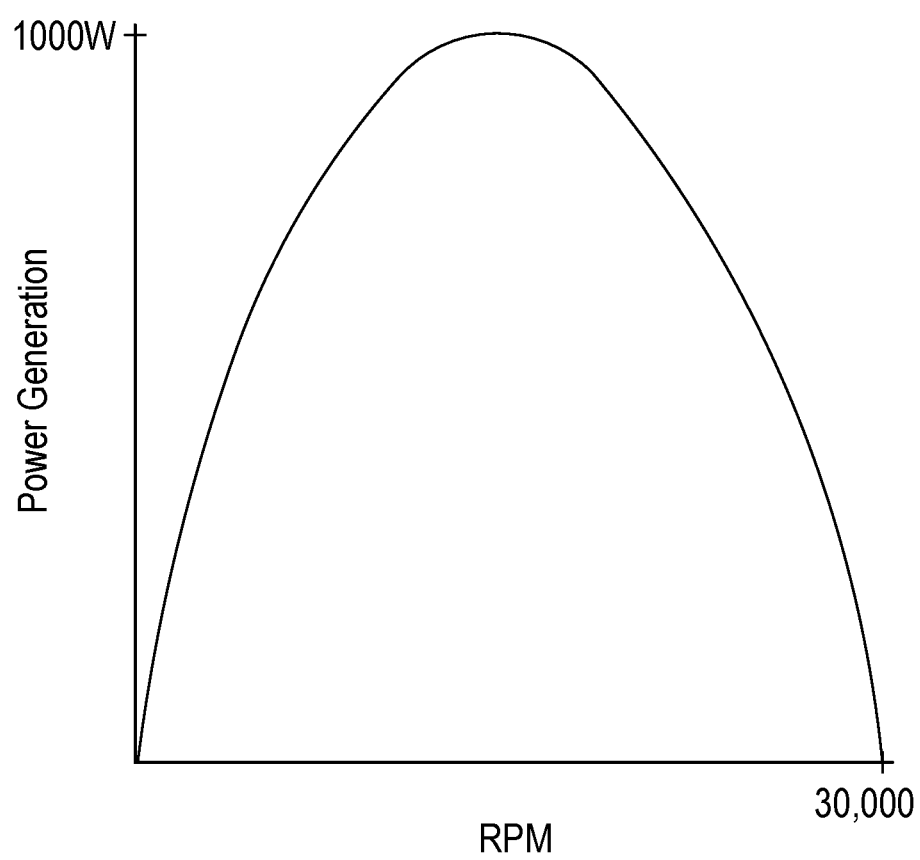
FIG. 25 is a chart illustrating a linear relationship between the rotational rate and the power generation rate of an embodiment of a turbine.

In some embodiments, the power generation of the generator and rotor (such as generator 2586 and rotor 2582 of FIG. 22) may be at least partially dependent upon the rotational rate of the rotor relative to the generator. In other embodiments, the power generation may have a substantially parabolic relationship with the rotational rate of the wheel. For example, FIG. 25 illustrates a parabolic relationship between a rotational rate of an embodiment of a turbine and a power generation of the turbine. In some embodiments, a turbine may have a parabolic relationship between the rotational rate and the power generation up to a rotational rate of 30,000 revolutions per minute (RPM). In other embodiments, a turbine may have a parabolic relation between the rotational rate and the power generation up to a power generation of approximately 1000 Watts at between 13,000 to 15,000 RPM.

Figure 26:
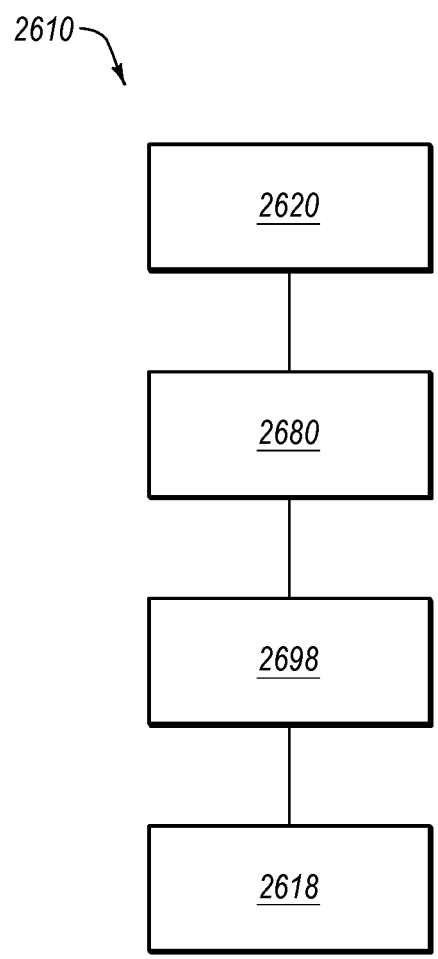
FIG. 26 is a system diagram that schematically represents the interaction of an embodiment of turbine, electronics package, and a valve in a downhole tool.

FIG. 26 is a system diagram of an embodiment of a downhole tool 2610 (such as a downhole tool 110 shown in a downhole environment in FIG. 1). In some embodiments, a downhole tool 2610 may include a fluid 2620 flowing through the downhole tool 2610, which may provide energy to a turbine 2680 (such as any embodiment of a turbine described in relation to FIG. 19 through FIG. 25). In some embodiments, the downhole tool 2610 may further include an electronics package 2698 that receives electricity and/or data from the turbine 2680 and controls a valve 2618 (such as any embodiment of a valve described in relation to FIG. 2 through FIG. 18-2).

In some embodiments, the electronics package 2698 may include a central processing unit (CPU), one or more storage devices, memory, one or more communication devices, a power storage device, printed circuit boards, one or more sensors, other electronic components, or combinations thereof. In other embodiments, the electronics package 2698 may be in data communication with one or more sensors, such as gyroscopes, accelerometers, other positioning sensors, pressure sensors, force meters, torque meters, other environmental sensors, or combinations thereof. The electronics package 2698 may be in data communication with the valve 2618 and may communicate with a valve actuator to send commands to the valve actuator to move the valve 2618 between a first configuration (e.g., an open configuration) and a second configuration (e.g., a closed configuration) to control one or more components of the downhole tool, such as a steering pad, downhole motor, anchor, packer, mill, or other downhole component.

Figure 27:
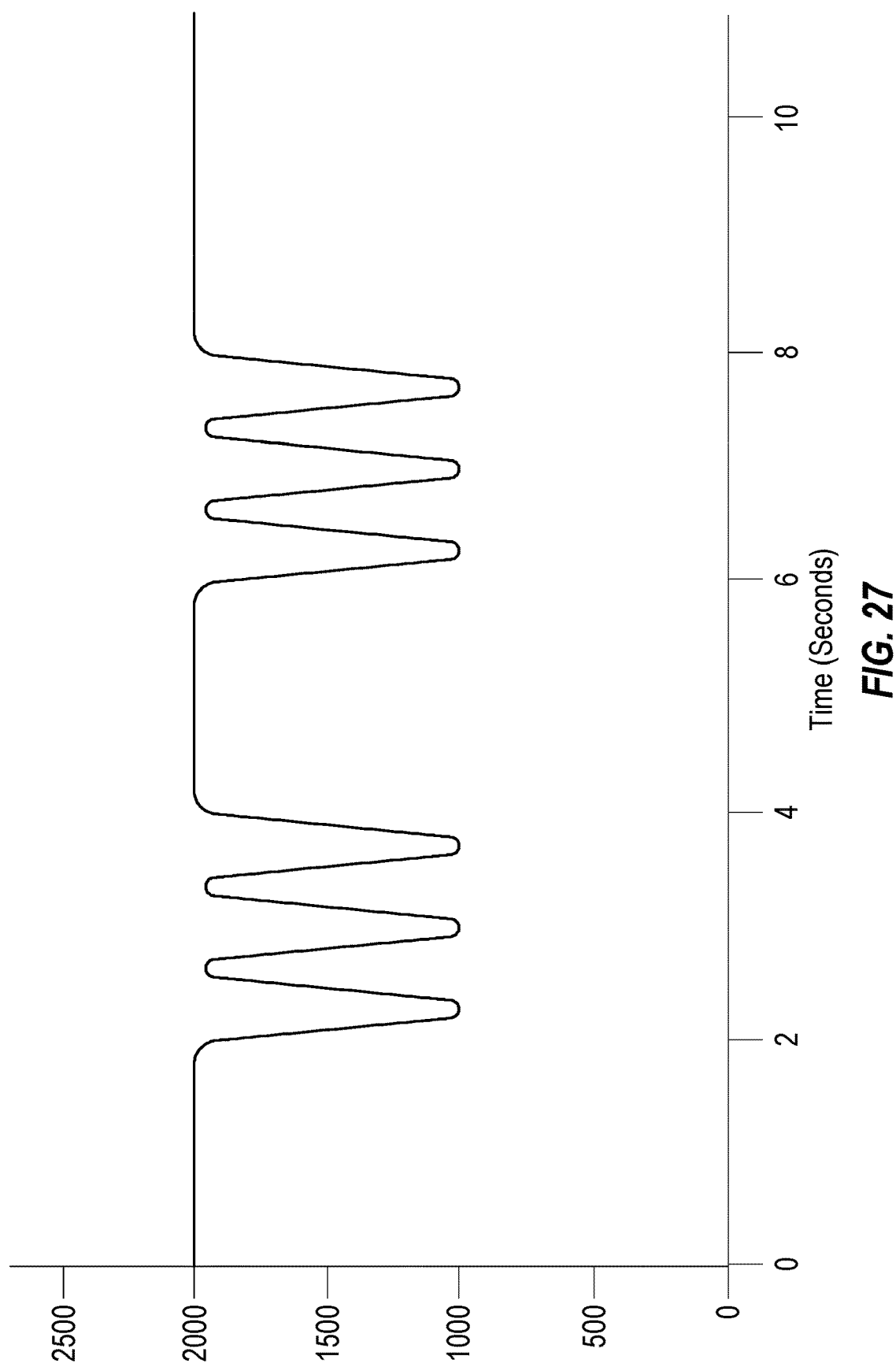
FIG. 27 is a chart that illustrates an embodiment of a pressure pulse series to communicate with a system including a turbine, electronics package, and a valve in a downhole tool.

FIG. 27 illustrates a method of communicating from a surface rig to a downhole tool using a series of pressure pulses. As described in relation to FIG. 24, the pressure differential across a turbine may change the RPM, and therefore, the power generation of the turbine. By altering the fluid pressure applied at the surface rig, the power may vary from the turbine, allowing electrical signals to be communicated to the electronics package or to other sensors in the downhole tool. For example, the fluid pressure across the turbine may be varied between 2,000 kPa and 1,000 kPA one or more times over a period of time to communicate a variety of commands to the electronics package.

In other embodiments, the fluid pressure may vary between a lower and an upper value in a range having an upper value, a lower value, or upper and lower values including any of 500 kPa; 1,000 kPa; 1,500 kPa; 2,000 kPa; 2,500 kPa; 3,000 kPa; 3,500 kPa; 4,000 kPa; 4,500 kPa; 5,000 kPa; 5,500 kPa; 6,000 kPa; 6,500 kPa; 7,000 kPa; 7,500 kPa; 8,000 kPa; 8,500 kPa; 9,000 kPa; or any values therebetween. For example, the pressure pulse may decrease the fluid pressure to 500 kPa. In other examples, the pressure pulse may increase the fluid pressure to 9,000 kPa. In yet other examples, the lower value of the pressure pulse may be in a range of 500 kPa to 9,000 kPa. In further examples, the upper value of the pressure pulse may be in a range of 500 kPa to 9,000 kPa.

In some embodiments, the duration of the pressure pulse may be in a range having an upper value, a lower value, or an upper and lower value including any of 0.25 s, 0.50 s, 0.75 s, 1.0 s, 1.25 s, 1.50 s, 1.75 s, 2.0 s, 2.25 s, 2.50 s, or any values therebetween. For example, the duration of the pressure pulse may be greater than 0.25 s. In other examples, the duration of the pressure pulse may be less than 2.50 s. In yet other examples, the duration of the pressure pulse may be less than 2.0 s. In further examples, the duration of the pressure pulse may be less than 1.5 s. In at least one example, the duration of the pressure pulse may be less than 1.0 s.

Figures 1, 28:
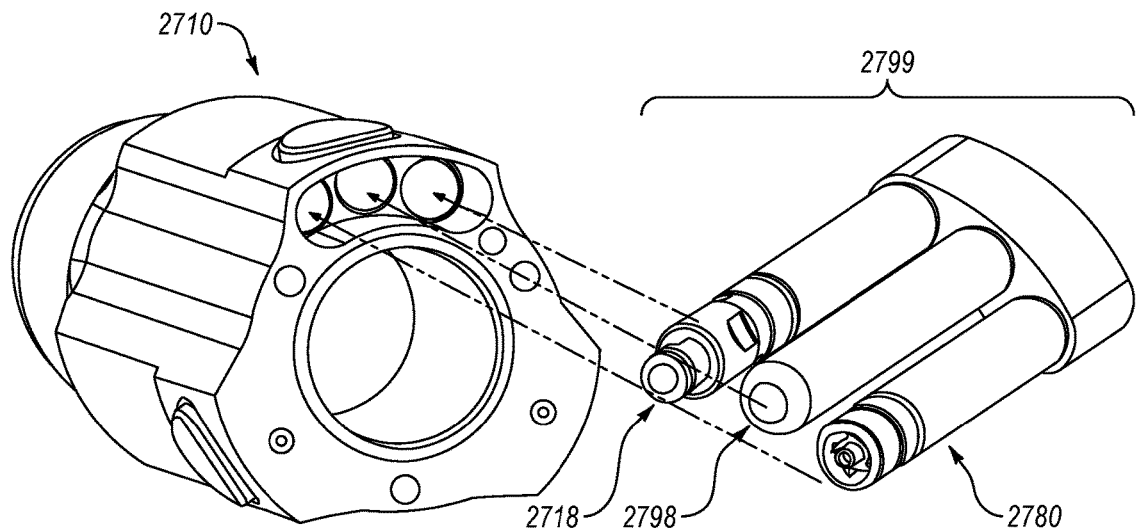
Figures 2, 28:
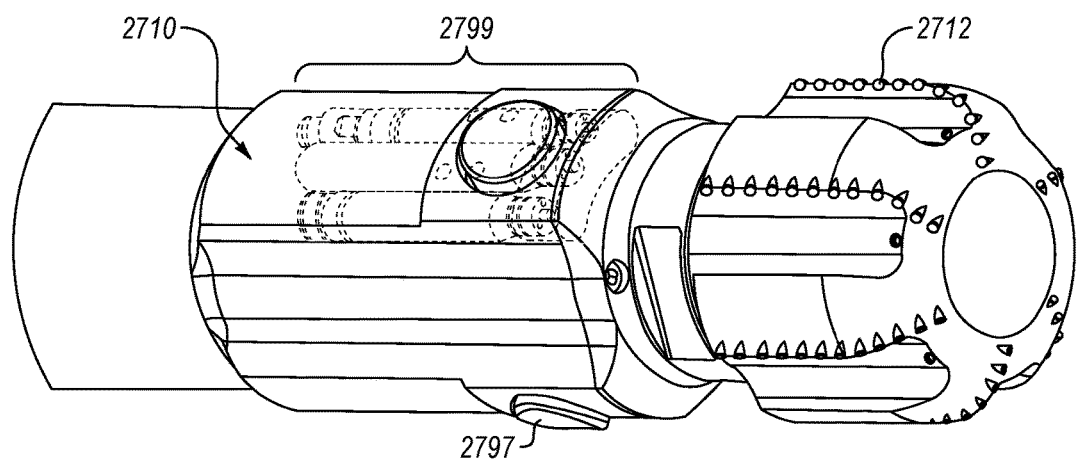

An embodiment of a system 2799, such as shown schematically in FIG. 26, is illustrated in FIG. 28-1 and FIG. 28-2. FIG. 28-1 shows a downhole tool 2710 in an exploded view with the system 2799 outside of the downhole tool 2710. The system 2799 may include a valve 2718, an electronics package 2798, and a turbine 2780 in communication with one another. In some embodiments, the system 2799 may have a total volume of less than 0.001416 cubic meters. In other embodiments, the system 2799 may have a total volume of less than 0.0015 cubic meters. In yet other embodiments, the system 2799 may have a total volume of less than 0.0020 cubic meters.

FIG. 28-2 illustrates the system 2799 installed in a wall of the downhole tool 2710 including a steering pad 2797. In some embodiments, the valve 2718, electronics package 2798, and turbine 2780 of the system 2799 may be mounted parallel to one another in the downhole tool 2710. For example, mounting the valve 2718, electronics package 2798, and turbine 2780 in a parallel configuration in the rotary steerable device of FIG. 28-2 may allow the system 2799 to occupy less longitudinal space in the downhole tool 2710 than conventional valve systems in conventional rotary steerable devices. In at least one embodiment, the shorter longitudinal length of the system 2799 mounted in parallel may allow for a shorter longitudinal length of the downhole tool 2710, increasing steerability of the associated drilling system.

In some embodiments, the system 2799 may be accessible through a side panel of the downhole tool 2710, further simplifying repairs by eliminating the need to decouple the downhole tool 2710 from other components of a BHA (such as a bit 2712) and recouple the components before tripping the drill string back down the wellbore.

Figures 1, 29:
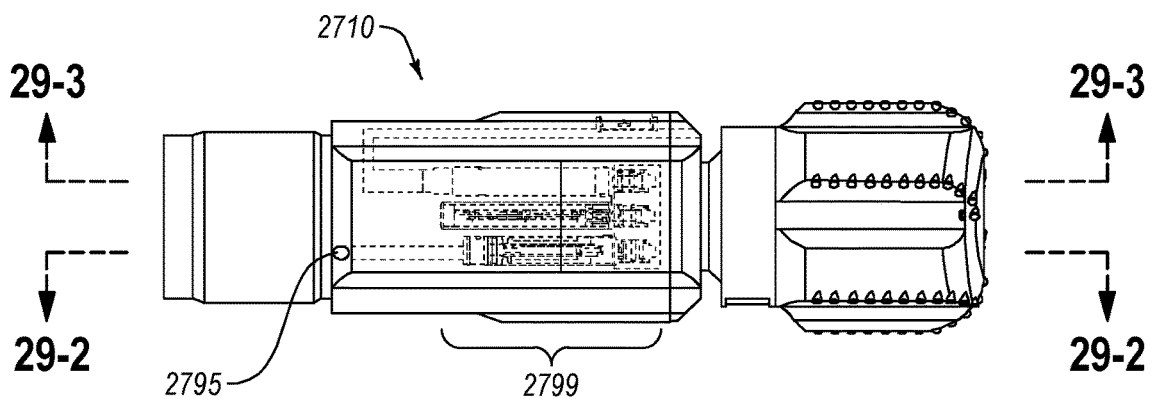
Figures 2, 29:
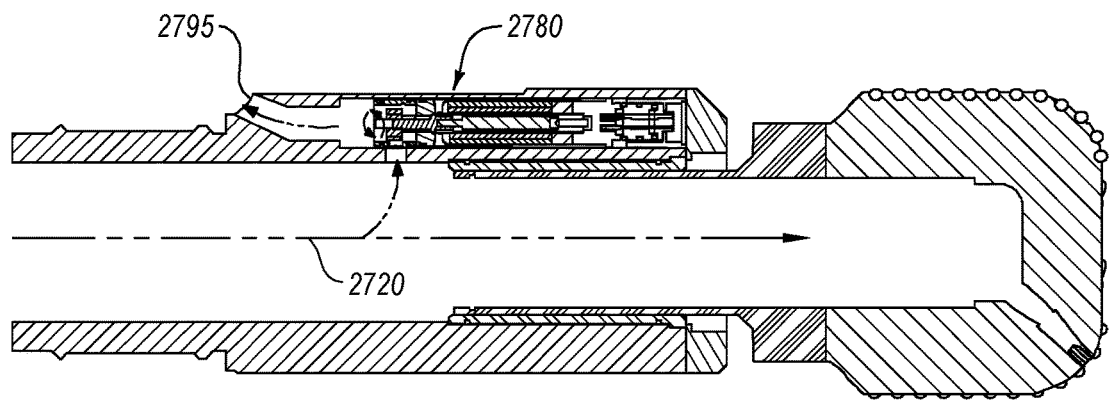
Figures 3, 29:
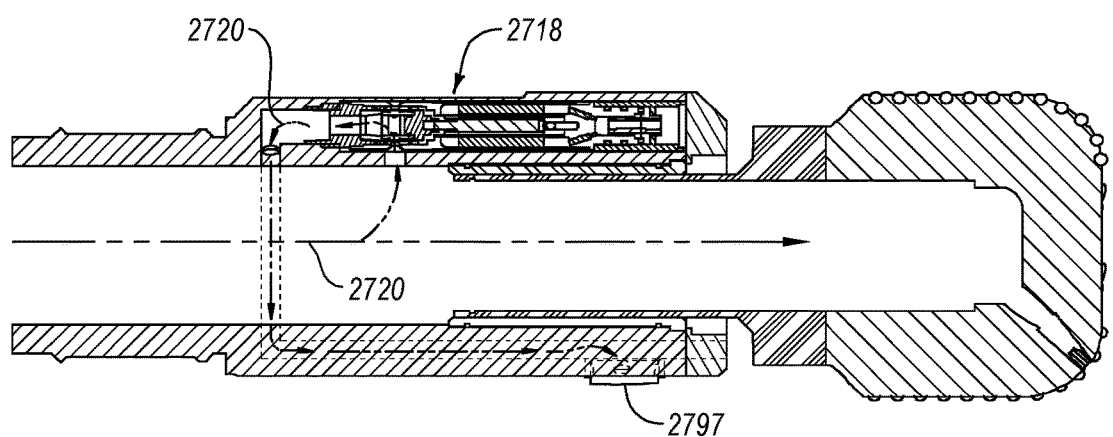

FIG. 29-1 through FIG. 29-3 illustrate the control of fluid through the downhole tool 2710 to actuate a steering pad. FIG. 29-1 is a side view of the downhole tool 2710 illustrating the positioning of the system 2799 and the associated exhaust 2795 to exhaust the fluid used to turn the turbine.

FIG. 29-2 shows the flow of drilling fluid 2720 into the turbine 2780. A portion of the fluid 2720 is tapped off into the turbine 2780 to turn the turbine 2780 and generate power. The fluid 2720 is then exhausted through an exhaust 2795 to the annular space around the drill string in the wellbore. As described herein, the turbine 2780 is powered by the pressure differential across the turbine 2780. Therefore, the fluid 2720 used to power the turbine 2780 is exhausted to the wellbore to increase the pressure differential.

In some embodiments, the power generated by the turbine 2780 may power the valve 2718 illustrated in FIG. 29-3. When actuated to move to an open position, valve 2718 may direct fluid 2720 toward a steering pad 2797. In some embodiments, the fluid 2720 may flow into an inlet of the valve and turn 90° and flow out of an outlet of the valve toward the steering pad 2797. The fluid pressure on the steering pad 2797 may actuate the steering pad 2797 and steer the rotary steerable system.

In some embodiments, a downhole tool may have a plurality of systems 2799 to control and/or power components of the downhole tool. For example, a downhole tool may a separate system 2799 for each of a plurality of steering pads 2797. In other examples, a downhole tool may have a plurality of systems 2799 to provided redundancy to the downhole tool to reduce down time of the drilling system.

In other embodiments, at least one of the systems 2799 may have a plurality of one or more components of the 2799. For example, a system 2799 may have a plurality of valves 2718 powered by one turbine 2780 and one electronics package. In other examples, a system 2799 may have a plurality of turbines 2780 powering a plurality of electronics packages, at least one of which controls one or more valves 2780. In yet other examples, a system 2799 may have one turbine 2780 that powers a plurality of electronics packages, at least one of which controls a valve 2780. In some embodiments, one or more of the components of the system may be omitted. For example, power may be transmitted to one or more electronics packages that operates one or more valves 2718, and no turbine 2780 may be included. Similarly, one or more turbines 2780 and one or more electronics packages may be used and no valve 2718 may be included.

The embodiments of downhole components and tools have been primarily described with reference to wellbore drilling operations, the downhole components and tools described herein may be used in applications other than the drilling of a wellbore. In other embodiments, downhole components and tools according to the present disclosure may be used outside a wellbore or other downhole environment used for the exploration or production of natural resources. For instance, downhole components and tools of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

We claim:

1. A rotor for a downhole power generation turbine, the rotor comprising:
   at least one blade, wherein at least a portion of the at least one blade includes an ultrahard material, the rotor and the at least one blade having a combined radius of less than 1.5 cm.

2. The rotor of claim 1, wherein the at least one blade is attached to a wheel, wherein the wheel has a larger diameter than the rotor and is connected to the rotor.

3. The rotor of claim 2, wherein the at least one blade is attached to the wheel with a removable attachment.

4. The rotor of claim 1, wherein the at least one blade includes the ultrahard material on a leading edge of the at least one blade.

5. The rotor of claim 1, the at least one blade including a removable ultrahard material insert.

6. The rotor of claim 1, the rotor having a longitudinal length of less than 20 cm.

7. A turbine for downhole power generation, the turbine comprising:
   a housing, the housing including:
      an inlet, and
      an outlet;
   a wheel, wherein the wheel includes at least one blade extending radially from a rotational axis of the wheel, at least a portion of the at least one blade includes polycrystalline diamond (PCD), wherein the wheel is configured to rotate by application of a fluid pressure to the at least one blade using a secondary fluid flow directed away from a primary fluid flow and into the inlet of the housing;
   an inner rotor, the inner rotor rotatable by the wheel; and
   a generator, at least a portion of the rotor disposed within the generator, the generator configured to generate power dependent on a rotational rate of the inner rotor.

8. The turbine of claim 7, further comprising an inlet nozzle having a diameter of less than 3.0 mm.

9. The turbine of claim 8, wherein the turbine has a power generation capacity of at least 1000 Watts.

10. The turbine of claim 8, further comprising a nozzle removably attached to the inlet or outlet.

11. The turbine of claim 10, wherein the nozzle has an opening of between 2 mm and 3 mm in diameter.

12. The turbine of claim 10, wherein the nozzle includes PCD.

13. The turbine of claim 8, wherein the outlet is oriented at a 90° angle relative to the inlet.

14. The turbine of claim 8, wherein a total longitudinal length of the turbine is less than 20 cm.

15. A method for generating electricity downhole, the method comprising:
   directing a secondary fluid flow from a primary fluid flow into a housing, the housing including an inlet, a wheel, and an outlet, the secondary fluid flow having a general fluid flow through the inlet, to the wheel, and out the outlet, wherein there is a pressure differential across both the inlet and the outlet;
   rotating the wheel, the wheel coupled with an inner rotor, wherein the wheel includes at least one blade, wherein the at least one blade includes polycrystalline diamond (PCD); and generating power in a generator, wherein the power generated is dependent on a rotational rate of the inner rotor.

16. The method of claim 15, wherein the fluid includes less than 6% added suspended solids.

17. The method of claim 15, wherein the pressure differential is less than 11000 kPa.

18. The method of claim 15, wherein generating power generates at least 1000 Watts of power.

19. The method of claim 15, wherein the wheel is rotated at between 13,000 rpm and 30,000 rpm.

20. The method of claim 15, wherein the fluid is directed approximately 90° into a chamber from the general fluid flow.

* * * * *